(12) United States Patent
Park et al.

(10) Patent No.: US 12,299,967 B2
(45) Date of Patent: May 13, 2025

(54) ELECTRONIC DEVICE AND OPERATION METHOD THEREOF FOR MULTIMODAL TEMPORAL-AXIS FUSION ARTIFICIAL INTELLIGENCE MODELS

(71) Applicant: PYLER CO., LTD., Seoul (KR)

(72) Inventors: Dong Chan Park, Seoul (KR); Mobeen Ahmad, Seoul (KR)

(73) Assignee: Pyler Co., Ltd., Seoul (KR)

( * ) Notice: Subject to any disclaimer, the term of this patent is extended or adjusted under 35 U.S.C. 154(b) by 0 days.

(21) Appl. No.: 18/809,395

(22) Filed: Aug. 20, 2024

(65) Prior Publication Data
US 2025/0078486 A1    Mar. 6, 2025

(30) Foreign Application Priority Data
Feb. 29, 2024  (KR) .......................... 10-2024-0029703

(51) Int. Cl.
*G06K 9/00*    (2022.01)
*G06V 10/62*   (2022.01)
(Continued)

(52) U.S. Cl.
CPC ............ *G06V 10/806* (2022.01); *G06V 10/62* (2022.01); *G06V 10/764* (2022.01); *G06V 30/18* (2022.01)

(58) Field of Classification Search
CPC .......... G06N 3/045; G06N 3/08; G06N 20/00; G06N 3/0464; G06N 3/044; G06N 3/084;
(Continued)

(56) References Cited

U.S. PATENT DOCUMENTS

2020/0311198 A1* 10/2020 Poon ....................... G06N 20/20
2021/0217031 A1*  7/2021 Zhang .................. G06Q 10/105

FOREIGN PATENT DOCUMENTS

CN       2023/0040954    4/2022
CN         114328988     4/2022
(Continued)

OTHER PUBLICATIONS

J. Kim, Y. Lee and J. Moon, "T2V2T: Text-to-Video-to-Text Fusion for Text-to-Video Retrieval," 2023 IEEE/CVF Conference on Computer Vision and Pattern Recognition Workshops (CVPRW), Vancouver, BC, Canada, Aug. 14, 2023, pp. 5613-5618 (Year: 2023).*
(Continued)

*Primary Examiner* — Alex Kok S Liew

(57) ABSTRACT

An electronic device for multimodal temporal-axis fusion artificial intelligence models is proposed. The electronic device comprises a storage unit, and a processor, wherein the processor may obtain a plurality of first visual features respectively corresponding to a plurality of different time points or time periods from a video, obtain a plurality of text features respectively corresponding to the plurality of time points or time periods from text, obtain a plurality of first local fusion features, respectively corresponding to the plurality of time points or time periods, from the plurality of first visual features and the plurality of text features by fusing the first visual features and the text features, which correspond to a same time point or time period, and obtain at least one global fusion feature from the plurality of first local fusion features.

22 Claims, 20 Drawing Sheets

(51) Int. Cl.
  *G06V 10/764* (2022.01)
  *G06V 10/80* (2022.01)
  *G06V 30/18* (2022.01)

(58) Field of Classification Search
  CPC .......... G06N 3/048; G06N 20/10; G06N 5/04;
    G06N 3/04; G06N 3/0455; G06N 3/082;
    G06N 5/022; G06N 3/0442; G06N 20/20;
    G06N 3/047; G06N 3/098; G06N 5/025;
    G06N 3/09; G06N 5/046; G06N 7/01;
    G06N 3/00; G06N 3/02; G06N 3/0895;
    G06N 3/008; G06N 3/0475; G06N 3/049;
    G06N 3/063; G06N 3/094; G06N 3/096;
    G06N 3/0985; G06N 5/01; G06N 5/045;
    G06N 3/0495; G06N 3/088; G06V 10/82;
    G06V 10/774; G06V 10/806; G06V
    10/764; G06V 10/776; G06V 20/41;
    G06V 10/26; G06V 20/46; G06V 10/761;
    G06V 30/19173; G06V 10/454; G06V
    10/7715; G06V 30/413; G06V 30/416;
    G06V 10/811; G06V 10/40; G06V 20/20;
    G06V 20/56; G06V 20/70; G06V 10/778;
    G06V 10/80; G06V 10/86; G06V 20/47;
    G06V 30/274; G06V 30/414
  See application file for complete search history.

(56) References Cited

FOREIGN PATENT DOCUMENTS

| | | |
|---|---|---|
| CN | 115311599 | 11/2022 |
| CN | 115995067 | 4/2023 |
| CN | 116030295 | 4/2023 |
| KR | 10-2023-0095505 | 6/2023 |

OTHER PUBLICATIONS

J. Huang, Y. Li, J. Feng, X. Wu, X. Sun and R. Ji, "Clover: Towards A Unified Video-Language Alignment and Fusion Model," 2023 IEEE/CVF Conference on Computer Vision and Pattern Recognition (CVPR), Vancouver, BC, Canada, 2023 (Year: 2023).*

Decision to Grant Dated Oct. 11, 2024 From the Korean Intellectual Property Office Re. Application No. 10-2024-0029703 and Its Translation Into English. (4 Pages).

International Search Report and the Written Opinion Dated Nov. 6, 2024 From the International Searching Authority Re. Application No. PCT/KR2024/010987 and Its Translations into English. (12 Pages).

Notice to Submit a Response Dated May 15, 2024 From the Korean Intellectual Property Office Re. Application No. 10-2024-0029703 and Its Translation Into English. (12 Pages).

* cited by examiner

ELECTRONIC DEVICE AND OPERATION METHOD THEREOF FOR MULTIMODAL TEMPORAL-AXIS FUSION ARTIFICIAL INTELLIGENCE MODELS

CROSS REFERENCE TO RELATED APPLICATION

This application claims the benefit of priority of Korean Patent Application Nos. 10-2023-0116664, filed on Sep. 4, 2023, and 10-2024-0029703, filed on Feb. 29, 2024, the contents of which are incorporated by reference as if fully set forth herein in their entirety.

FIELD AND BACKGROUND OF THE INVENTION

Field of the Invention

The present disclosure relates to an electronic device and an operation method thereof. More particularly, the present disclosure relates to an electronic device and an operation method thereof for multimodal temporal-axis fusion artificial intelligence models.

Description of the Related Art

Research on multimodal artificial intelligence models capable of comprehensively utilizing different types of input is actively underway. Recently, beyond still image-text multimodal artificial intelligence models, research on video-text multimodal artificial intelligence models has been receiving great attention. The existing video-text multimodal artificial intelligence models have used a method of obtaining aggregated visual vectors from a video, obtaining text vectors from text, and fusing the aggregated visual vectors and the text vectors, whereby there are limitations in the performance of existing video-text multimodal artificial intelligence models because the visual features and the text features are not precisely fused on a temporal axis.

SUMMARY OF THE INVENTION

An objective of the present disclosure for solving the problem described above is to provide an electronic device and an operation method thereof for video-text multimodal artificial intelligence models with improved performance.

According to exemplary embodiments of the present disclosure, there is provided an electronic device for multimodal temporal-axis fusion artificial intelligence models, the electronic device including: a storage unit; and a processor, wherein the processor may obtain a plurality of first visual features respectively corresponding to a plurality of different time points or time periods from a video, obtain a plurality of text features respectively corresponding to the plurality of time points or time periods from text, obtain a plurality of first local fusion features, respectively corresponding to the plurality of time points or time periods, from the plurality of first visual features and the plurality of text features by fusing the first visual features and the text features, which correspond to a same time point or time period, and obtain at least one global fusion feature from the plurality of first local fusion features.

According to exemplary embodiments of the present disclosure, there is provided an operation method of an electronic device for multimodal temporal-axis fusion artificial intelligence models, the operation method including: obtaining a plurality of first visual features respectively corresponding to a plurality of different time points or time periods from a video; obtaining a plurality of text features respectively corresponding to the plurality of time points or time periods from text; obtaining a plurality of first local fusion features, respectively corresponding to the plurality of time points or time periods, from the plurality of first visual features and the plurality of text features by fusing the first visual features and the text features, which correspond to a same time point or time period; and obtaining at least one global fusion feature from the plurality of first local fusion features.

According to the exemplary embodiments of the present disclosure, the embodiments of the present disclosure are configured to extend a text feature along a temporal axis, locally fuse a visual feature and the text feature at each time point or time period, and globally fuse local fusion features on the temporal axis across multiple time points or time periods, i.e., perform multilevel temporal-axis fusion, whereby the performance of video-text multimodal artificial intelligence models may be improved by enabling finer and more complete fusion of the visual features and the text features.

DESCRIPTION OF SPECIFIC EMBODIMENTS OF THE INVENTION

Hereinafter, an operation principle of preferred exemplary embodiments of the present disclosure will be described in detail with reference to the attached drawings. In addition, when the exemplary embodiments of the present disclosure are described, the detailed description will be omitted in a case where it is determined that a detailed description of a related known function or configuration may obscure the gist of the present disclosure. In addition, the terms used below are terms defined in consideration of the functions in the present disclosure, and may vary depending on the intention or practice of users or operators. Therefore, the definitions of the terms used herein should be interpreted on the basis of the content and corresponding functions throughout the present specification.

Figure 1:
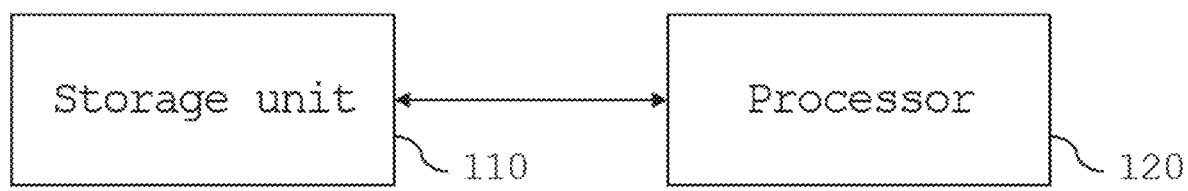
FIG. 1 is a block diagram illustrating an electronic device for multimodal temporal-axis fusion artificial intelligence models according to the exemplary embodiments of the present disclosure.

FIG. 1 is a block diagram illustrating an electronic device for multimodal temporal-axis fusion artificial intelligence models according to the exemplary embodiments of the present disclosure. Referring to FIG. 1, the electronic device 100 may include a storage unit 110 and a processor 120.

The storage unit 110 may store various kinds of data and programs. For example, the storage unit 110 may store multimodal temporal-axis fusion artificial intelligence models MD and MD' (see FIGS. 2 and 7, respectively). In the exemplary embodiment, the storage unit 110 may store video data and text data, which are input to the artificial intelligence models. The storage unit 110 may include at least one of a volatile memory and a non-volatile memory. For example, the volatile memory may include a DRAM, a SRAM, a SDRAM, a DDR SDRAM, a FeRAM, an MRAM, a PRAM, a PoRAM, or a ReRAM. For example, the non-volatile memory may include a flash memory, a mask ROM, a PROM, an OTPROM, an EPROM, an EEPROM, a hard disk, or an optical disk.

The processor 120 may control the overall operation of the electronic device 100. The processor 120 may control the storage unit 110. For example, the processor 120 may include at least one of a central processing unit (CPU) and a graphics processing unit (GPU).

In the exemplary embodiment, the processor 120 may obtain a plurality of first visual features respectively corresponding to a plurality of different time points or time periods from a video, obtain a plurality of text features respectively corresponding to the plurality of time points or time periods from text, obtain a plurality of first local fusion features, respectively corresponding to the plurality of time points or time periods, from the plurality of first visual features and the plurality of text features by fusing the first visual features and the text features, which correspond to a same time point or time period, and obtain at least one global fusion feature from the plurality of first local fusion features.

In the exemplary embodiment, in order to obtain the plurality of text features, the processor 120 may obtain the plurality of text features respectively corresponding to the plurality of time points or time periods from the text by using a plurality of mapping layers respectively corresponding to the plurality of time points or time periods.

In the exemplary embodiment, in order to obtain the plurality of text features, the processor 120 may obtain a plurality of first intermediate text features from the text, obtain a plurality of second intermediate text features respectively corresponding to the plurality of time points or time periods from the plurality of first intermediate text features by using a plurality of mapping layers respectively corresponding to the plurality of time points or time periods, and obtain the plurality of text features from the plurality of second intermediate text features by changing dimensions of the second intermediate text features.

In the exemplary embodiment, the number of the plurality of first intermediate text features may be different from the number of the plurality of second intermediate text features.

In the exemplary embodiment, a dimension of each of the plurality of text features may be a same as a dimension of each of the plurality of first visual features.

In the exemplary embodiment, in order to obtain the plurality of first local fusion features, the processor 120 may obtain the first local fusion features from the first visual features and the text features by using convolution.

In the exemplary embodiment, in order to obtain the plurality of first local fusion features, the processor 120 may obtain a plurality of first intermediate local fusion features from the first visual features and the text features, obtain a plurality of second intermediate local fusion features from the first intermediate local fusion features by using convolution, and obtain the first local fusion features from the first visual features and the second intermediate local fusion features.

In the exemplary embodiment, in order to obtain the plurality of first visual features, the processor 120 may obtain a plurality of object features from the video, obtain a plurality of object graphs from the plurality of object features, and obtain the plurality of first visual features from the plurality of object graphs.

In the exemplary embodiment, the processor 120 may obtain a plurality of second visual features respectively corresponding to the plurality of time points or time periods from the video, obtain a plurality of second local fusion features, respectively corresponding to the plurality of time points or time periods, from the plurality of second visual features and the plurality of text features by fusing the second visual features and the text features, which correspond to the same time point or time period, obtain a plurality of third local fusion features respectively corresponding to the plurality of time points or time periods from the plurality of first local fusion features and the plurality of second local fusion features, and obtain the at least one global fusion feature from the plurality of third local fusion features.

In the exemplary embodiment, in order to obtain the at least one global fusion feature, the processor 120 may obtain the at least one global fusion feature from the plurality of first local fusion features by using self-attention.

In the exemplary embodiment, the text includes a question, and the processor 120 may obtain an answer to the question by using the at least one global fusion feature.

In the exemplary embodiment, the at least one global fusion feature includes a plurality of global fusion features, and in order to obtain the answer to the question, the processor 120 may obtain an aggregated vector from the plurality of global fusion features, obtain a plurality of option features respectively from a plurality of options, and obtain the answer to the question from the aggregated vector and each option feature.

In the exemplary embodiment, the processor 120 may classify, search, predict, or generate the video by using the at least one global fusion feature.

Figure 2:
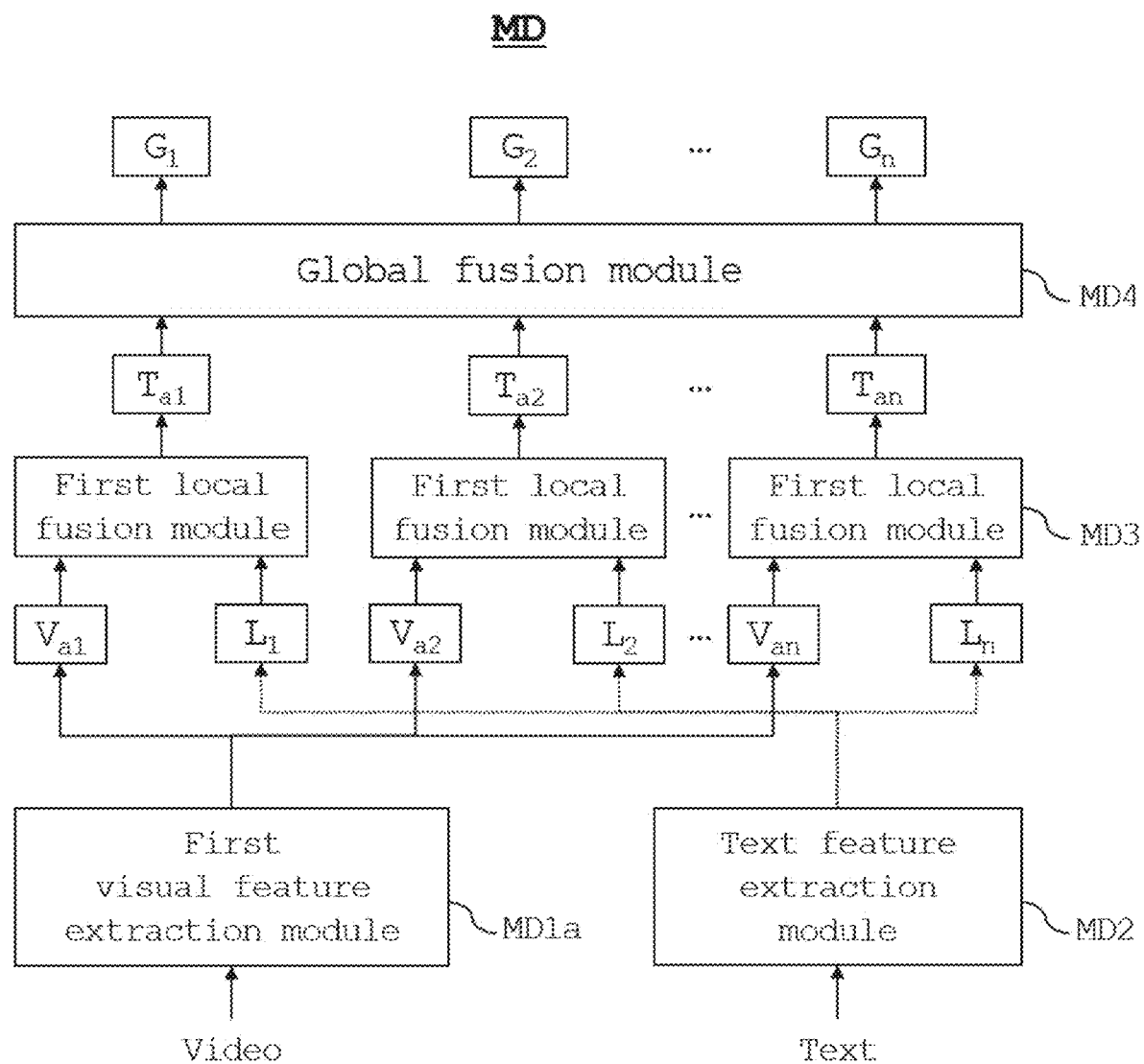
FIG. 2 is a conceptual diagram illustrating a multimodal temporal-axis fusion artificial intelligence model according to the exemplary embodiments of the present disclosure.
Figure 5:
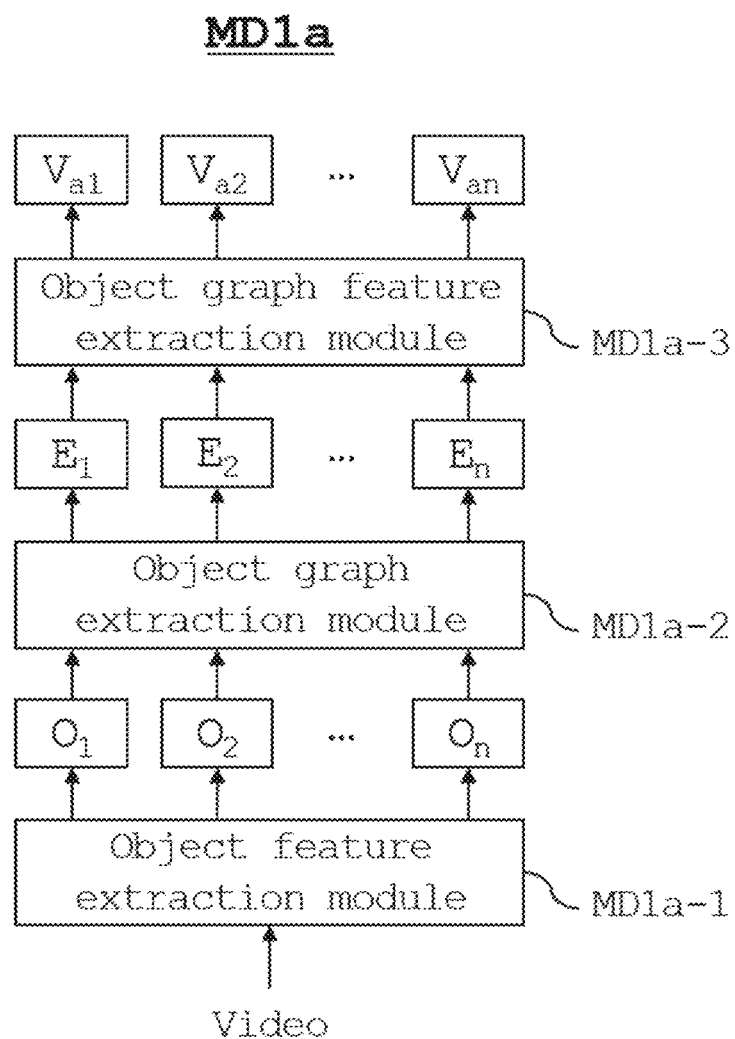
FIG. 5 is a conceptual diagram illustrating a first visual feature extraction module used in the electronic device according to the exemplary embodiments of the present disclosure.

FIG. 2 is a conceptual diagram illustrating a multimodal temporal-axis fusion artificial intelligence model according to the exemplary embodiments of the present disclosure. Referring to FIG. 2, the multimodal temporal-axis fusion artificial intelligence model MD may include a first visual feature extraction module MD1$a$ for obtaining a plurality of first visual features $V_{a1}$ to $V_{an}$ respectively corresponding to a plurality of different time points or time periods from a video. In the exemplary embodiment, the first visual feature extraction module MD1$a$ may include a first visual feature extraction module MD1$a$ as shown in FIG. 5. The processor 120 (see FIG. 1) may obtain the plurality of first visual features $V_{a1}$ to $V_{an}$ respectively corresponding to the plurality of different time points or time periods from the video by using the first visual feature extraction module MD1$a$.

Hereinafter, unless otherwise specified, the processor 120 refers to the processor 120 in FIG. 1.

In the exemplary embodiment, the first visual feature extraction module MD1a may include at least one of an AlexNet (Krizhevsky et al., ImageNet Classification with Deep Convolutional Neural Networks, NIPS 2012), a VGG-Net (Simonyan et al., Very Deep Convolutional Networks for Large-Scale Image Recognition, ICLR 2015), a GoogleNet (Szegedy et al., Going Deeper with Convolutions, CVPR 2015), an ResNet (He et al., Deep Residual Learning for Image Recognition, CVPR 2016), and a ViT (Dosovitskiy et al., An Image is Worth 16×16 Words: Transformers or Image Recognition at Scale, ICLR 2021).

In the exemplary embodiment, the video may be an advertising video. In the exemplary embodiment, the video may include a plurality of frames respectively corresponding to a plurality of different time points, and each frame may be a still image.

In the exemplary embodiment, each of the first visual features $V_{a1}$ to $V_{an}$ may be a vector, matrix, or tensor. In the exemplary embodiment, the plurality of first visual features $V_{a1}$ to $V_{an}$ may respectively correspond to the plurality of different time points or time periods. In the exemplary embodiment, the first visual features $V_{a1}$ to $V_{an}$ may correspond to respective frames (i.e., time points). In another exemplary embodiment, the first visual features $V_{a1}$ to $V_{an}$ may respectively correspond to a plurality of consecutive frames (i.e., time periods). In a yet another exemplary embodiment, at least one or more of the plurality of first visual features $V_{a1}$ to $V_{an}$ may correspond to respective frames (i.e., time points), and the remainders of the plurality of first visual features $V_{a1}$ to $V_{an}$ may respectively correspond to a plurality of consecutive frames (i.e., time periods).

Figure 3:
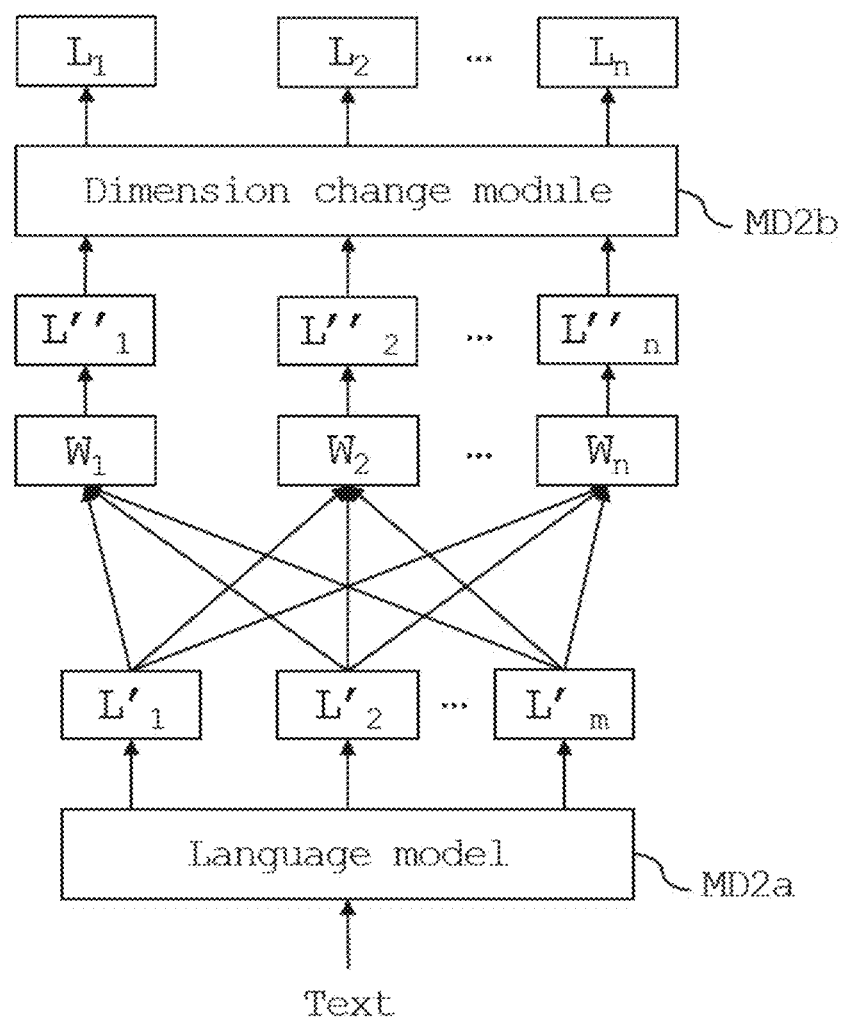
FIG. 3 is a conceptual diagram illustrating a text feature extraction module used in the electronic device according to the exemplary embodiments of the present disclosure.

The multimodal temporal-axis fusion artificial intelligence model MD may further include a text feature extraction module MD2 for obtaining a plurality of text features $L_1$ to $L_n$ respectively corresponding to the plurality of different time points or time periods from text. In the exemplary embodiment, the text feature extraction module MD2 may include a text feature extraction module MD2 as shown in FIG. 3. The processor 120 may obtain the plurality of text features $L_1$ to $L_n$ respectively corresponding to the plurality of different time points or time periods from the text by using the text feature extraction module MD2.

In the exemplary embodiment, the text may include at least one of subtitles of the video, a comment of the video, a title of the video, a description of the video, and a classification standard of the video.

In the exemplary embodiment, each of the text features $L_1$ to $L_n$ may be a vector, matrix, or tensor. In the exemplary embodiment, a dimension of each of the text features $L_1$ to $L_n$ may be the same as a dimension of each of the first visual features $V_{a1}$ to $V_{an}$. That is, the number of real numbers constituting each of the text features $L_1$ to $L_n$ may be the same as the number of real numbers constituting each of the first visual features $V_{a1}$ to $V_{an}$.

In the exemplary embodiment, the plurality of text features $L_1$ to $L_n$ may respectively correspond to the plurality of different time points or time periods. In the exemplary embodiment, the text features $L_1$ to $L_n$ may correspond to respective frames (i.e., time points). In another exemplary embodiment, the text features $L_1$ to $L_n$ may respectively correspond to a plurality of consecutive frames (i.e., time periods). In a yet another exemplary embodiment, at least one or more of the plurality of text features $L_1$ to $L_n$ may correspond to respective frames (i.e., time points), and the remainders of the plurality of text features $L_1$ to $L_n$ may respectively correspond to a plurality of consecutive frames (i.e., time periods).

Figure 4:
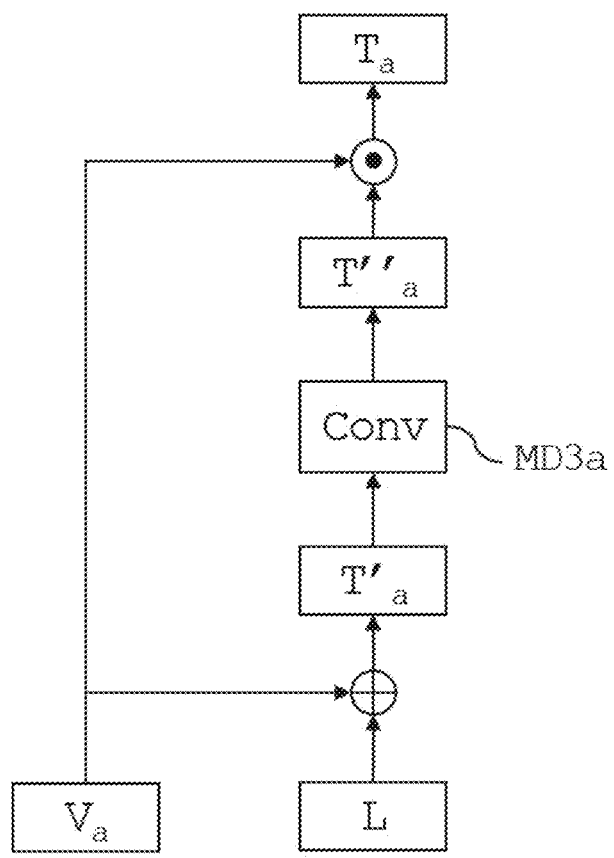
FIG. 4 is a conceptual diagram illustrating a first local fusion module used in the electronic device according to the exemplary embodiments of the present disclosure.

The multimodal temporal-axis fusion artificial intelligence model MD may further include a first local fusion module MD3 for obtaining a plurality of first local fusion features $T_{a1}$ to $T_{an}$, respectively corresponding to the plurality of different time points or time periods, from the plurality of first visual features $V_{a1}$ to $V_{an}$ and the plurality of text features $L_1$ to $L_n$ by fusing the first visual features and the text features, which correspond to the same time point or time period. In the exemplary embodiment, the first local fusion module MD3 may include a first local fusion module MD3 as shown in FIG. 4. The processor 120 may obtain the plurality of first local fusion features $T_{a1}$ to $T_{an}$ respectively corresponding to the plurality of different time points or time periods from the plurality of first visual features $V_{a1}$ to $V_{an}$ and the plurality of text features $L_1$ to $L_n$ by using the first local fusion module MD3 to fuse the first visual features and the text features, which correspond to the same time point or time period. For example, the processor 120 may obtain a first local fusion feature $T_{a1}$ corresponding to a first time point by fusing a first visual feature $V_{a1}$ corresponding to the first time point and a text feature $L_1$ corresponding to the first time point.

In the exemplary embodiment, each of the first local fusion features $T_{a1}$ to $T_{an}$ may be a vector, matrix, or tensor. In the exemplary embodiment, the plurality of local fusion features $T_{a1}$ to $T_{an}$ may respectively correspond to the plurality of different time points or time periods. In the exemplary embodiment, the first local fusion features $T_{a1}$ to $T_{an}$ may correspond to respective frames (i.e., time points). In another exemplary embodiment, the first local fusion features $T_{a1}$ to $T_{an}$ may respectively correspond to a plurality of consecutive frames (i.e., time periods). In a yet another exemplary embodiment, at least one or more of the plurality of first local fusion features $T_{a1}$ to $T_{an}$ may correspond to respective frames (i.e., time points), and the remainders of the plurality of first local fusion features $T_{a1}$ to $T_{an}$ may respectively correspond to a plurality of consecutive frames (i.e., time periods).

The multimodal temporal-axis fusion artificial intelligence model MD may further include a global fusion module MD4 for obtaining at least one global fusion feature, e.g., a plurality of global fusion features $G_1$ to $G_n$, from the plurality of first local fusion features $T_{a1}$ to $T_{an}$. The processor 120 may obtain the at least one global fusion feature, e.g., the plurality of global fusion features $G_1$ to $G_n$, from the plurality of first local fusion features $T_{a1}$ to $T_{an}$ by using the global fusion module MD4.

In the exemplary embodiment, the global fusion module MD4 may include a self-attention layer. The processor 120 may obtain the at least one global fusion feature, e.g., the plurality of global fusion features $G_1$ to $G_n$, from the plurality of first local fusion features $T_{a1}$ to $T_{an}$ by using self-attention. The self-attention may be at least one of narrow self-attention (Vaswani et al., Attention is All you Need, NIPS 2017) and modified self-attention. The narrow self-attention may include multi-head self-attention. For example, the global fusion module MD4 may include at least one of a narrow transformer (Vaswani et al., Attention is All you Need, NIPS 2017 or An Image is Worth 16×16 Words: Transformers for Image Recognition at Scale, ICLR 2021) and a modified transformer. For example, the modified transformer may include at least one of a Swin transformer (Liu et al., Swin Transformer: Hierarchical Vision Transformer using Shifted Windows, ICCV 2021), a Reformer (Kitaev et al., Reformer: The efficient transformer, ICLR 2020), a Linformer (Wang et al., Linformer: Self-attention with linear complexity, arXiv 2020), a Performer (Choromanski et al., Rethinking attention with performers, ICLR 2020), and a Longformer (Beltagy et al., Longformer: The long-document transformer, arXiv 2020).

In the exemplary embodiment, each of the global fusion features $G_1$ to $G_n$ may be a vector, matrix, or tensor. In the exemplary embodiment, the plurality of global fusion features $G_1$ to $G_n$ may respectively correspond to the plurality of different time points or time periods. In the exemplary embodiment, the global fusion features $G_1$ to $G_n$ may correspond to respective frames (i.e., time points). In another exemplary embodiment, the global fusion features $G_1$ to $G_n$ may respectively correspond to a plurality of consecutive frames (i.e., time periods). In a yet another exemplary embodiment, at least one or more of the plurality of global fusion features $G_1$ to $G_n$ may correspond to respective frames (i.e., time points), and the remainders of the plurality of global fusion features $G_1$ to $G_n$ may respectively correspond to a plurality of consecutive frames (i.e., time periods).

FIG. 3 is a conceptual diagram illustrating a text feature extraction module used in the electronic device according to the exemplary embodiments of the present disclosure. Referring to FIG. 3, the text feature extraction module MD2 may include a plurality of mapping layers $W_1$ to $W_n$ respectively corresponding to the plurality of different time points or time periods. The processor 120 may obtain the plurality of text features $L_1$ to $L_n$ respectively corresponding to the plurality of different time points or time periods from the text by using the plurality of mapping layers $W_1$ to $W_n$ respectively corresponding to the plurality of different time points or time periods. In the exemplary embodiment, the plurality of mapping layers may include a plurality of different matrices. The processor 120 may obtain the text features $L_1$ to $L_n$ different for each time point or time period by using the mapping layers $W_1$ to $W_n$ different for each time point or time period.

In the exemplary embodiment, the text feature extraction module MD2 may include a language model MD2a for obtaining a plurality of first intermediate text features $L'_1$ to $L'_m$ from the text. The processor 120 may obtain the plurality of first intermediate text features $L'_1$ to $L'_m$ from the text by using the language model MD2a. In the exemplary embodiment, the plurality of first intermediate text features $L'_1$ to $L'_m$ may correspond to respective tokens of the text. In the exemplary embodiment, each of the first intermediate text features $L'_1$ to $L'_m$ may be a vector, matrix, or tensor.

In the exemplary embodiment, the language model MD2a may include at least one of a recurrent neural network (RNN)-based language model and a transformer-based language model. The recurrent neural network-based language model may include at least one of a narrow RNN, a Long Short-Term Memory (LSTM), a Gated Recurrent Unit (GRU), and a Bidirectional-RNN (Bi-RNN). The transformer-based language model may include, for example, at least one of a BERT (Devlin et al., BERT: Pre-training of Deep Bidirectional Transformer for Language Understanding, A C L 2019), and a RoBERTa (Liu et al., RoBERTa: A Robustly Optimized BERT Pretraining Approach, ICLR 2020).

In the exemplary embodiment, the text feature extraction module MD2 may include the plurality of mapping layers $W_1$ to $W_n$ for obtaining a plurality of second intermediate text features $L''_1$ to $L''_n$ respectively corresponding to the plurality of different time points or time periods from the plurality of first intermediate text features $L'_1$ to $L'_m$. The mapping layers $W_1$ to $W_n$ may correspond to respective time points or time periods. The processor 120 may obtain the plurality of second intermediate text features $L''_1$ to $L''_n$ respectively corresponding to the plurality of different time points or time periods from the plurality of first intermediate text features $L'_1$ to $L'_m$ by using the plurality of mapping layers $W_1$ to $W_n$ respectively correspond to the plurality of different time points or time periods. For example, by using a mapping layer $W_1$ corresponding to a first time point, the processor 120 may obtain a second intermediate text feature $L''_1$ corresponding to the first time point from the plurality of first intermediate text features $L'_1$ to $L'_m$ respectively corresponding to a plurality of tokens of the text. In the exemplary embodiment, the number m of the first intermediate text features $L'_1$ to $L'_m$ may be different from the number n of the second intermediate text features $L''_1$ to $L''_n$.

In the exemplary embodiment, each of the second intermediate text features $L''_1$ to $L''_n$ may be a vector, matrix, or tensor. In the exemplary embodiment, the plurality of second intermediate text features $L''_1$ to $L''_n$ may respectively correspond to the plurality of different time points or time periods. In the exemplary embodiment, the second intermediate text features $L''_1$ to $L''_n$ may correspond to respective frames (i.e., time points). In another exemplary embodiment, the second intermediate text features $L''_1$ to $L''_n$ may respectively correspond to a plurality of consecutive frames (i.e., time periods). In a yet another exemplary embodiment, at least one or more of the plurality of second intermediate text features $L''_1$ to $L''_n$ may correspond to respective frames (i.e., time points), and the remainders of the plurality of second intermediate text features $L''_1$ to $L''_n$ may respectively correspond to a plurality of consecutive frames (i.e., time periods).

In the exemplary embodiment, the text feature extraction module MD2 may include a dimension change module MD2b for obtaining the plurality of text features $L_1$ to $L_n$ from the plurality of second intermediate text features $L''_1$ to $L''_n$ by changing dimensions of the second intermediate text features $L''_1$ to $L''_n$. The processor 120 may obtain the plurality of text features $L_1$ to $L_n$ from the plurality of second intermediate text features $L''_1$ to $L''_n$ by using the dimension change module MD2b to change the dimensions of the second intermediate text features $L''_1$ to $L''_n$. For example, the processor 120 may obtain a text feature $L_1$ corresponding to a first time point from a second intermediate text feature $L''_1$ corresponding to the first time point by using the dimension change module MD2b. The number of real numbers constituting each of the second intermediate text features $L''_1$ to $L''_n$ and the number of real numbers constituting each of the text features $L_1$ to $L_n$ may be different from each other. In the exemplary embodiment, the dimensions of the text features $L_1$ to $L_n$ may respectively be the same as the dimensions of the first visual features $V_{a1}$ to $V_{an}$ (see FIG. 2). That is, the number of real numbers constituting each of the text features $L_1$ to $L_n$ may be the same as the number of real numbers constituting each of the first visual features $V_{a1}$ to $V_{an}$ (see FIG. 2).

FIG. 4 is a conceptual diagram illustrating a first local fusion module used in the electronic device according to the exemplary embodiments of the present disclosure. Referring to FIG. 4, the first local fusion module MD3 may include a convolutional network MD3a. In the exemplary embodiment, the convolutional network MD3a may include a pooling layer, a 1×1 convolutional layer, and an activation layer. For example, the pooling layer may include at least one of a channel-wise average layer, a channel maximum (max) layer, and a channel minimum (min) layer. For example, the activation layer may include a sigmoid layer, a ReLU layer, or a tanh layer. The processor 120 may obtain a first local fusion feature $T_a$ from a first visual feature $V_a$ and a text feature L by using convolution.

In the exemplary embodiment, the processor 120 may obtain a first intermediate local fusion feature $T'_a$ from the first visual feature $V_a$ and the text feature L. In the exemplary embodiment, the first intermediate local fusion feature $T'_a$ may be a vector, matrix, or tensor. For example, the processor 120 may obtain the first intermediate local fusion feature $T'_a$ by obtaining the sum of the first visual feature $V_a$ and the text feature L.

In the exemplary embodiment, the processor 120 may obtain a second intermediate local fusion feature $T''_a$ from the first intermediate local fusion feature $T'_a$ by using the convolutional network MD3$a$. In the exemplary embodiment, the second intermediate local fusion feature $T''_a$ may be a vector, matrix, or tensor.

In the exemplary embodiment, the processor 120 may obtain the first local fusion feature $T_a$ from the first visual feature $V_a$ and the second intermediate local fusion feature $T''_a$. For example, the processor 120 may obtain the first local fusion feature $T_a$ by obtaining a value calculated by taking a dot product of the first visual feature $V_a$ and the second intermediate local fusion feature $T''_a$.

FIG. 5 is a conceptual diagram illustrating a first visual feature extraction module used in the electronic device according to the exemplary embodiments of the present disclosure. Referring to FIG. 5, the first visual feature extraction module MD1$a$ may include an object feature extraction module MD1$a$-1 for obtaining a plurality of object features $O_1$ to $O_n$ from the video. The processor 120 may obtain the plurality of object features $O_1$ to $O_n$ from the video by using the object feature extraction module MD1$a$-1. For example, the object feature extraction module MD1$a$-1 may include at least one of a Faster-RCNN (Ren et al., Faster R-CNN: Towards Real-Time Object Detection with Region Proposal Networks, NIPS 2015) and a YOLO (Redmon et al., You Only Look Once: Unified, Real-Time Object Detection, CVPR 2016).

In the exemplary embodiment, each of the plurality of object features $O_1$ to $O_n$ may be a vector, matrix, or tensor. In the exemplary embodiment, the plurality of object features $O_1$ to $O_n$ may respectively correspond to the plurality of different time points or time periods. In the exemplary embodiment, the object features $O_1$ to $O_n$ may correspond to respective frames (i.e., time points). In another exemplary embodiment, the object features $O_1$ to $O_n$ may respectively correspond to a plurality of consecutive frames (i.e., time periods). In a yet another exemplary embodiment, at least one or more of the plurality of object features $O_1$ to $O_n$ may correspond to respective frames (i.e., time points), and the remainders of the plurality of object features $O_1$ to $O_n$ may respectively correspond to a plurality of consecutive frames (i.e., time periods).

In the exemplary embodiment, the first visual feature extraction module MD1$a$ may include an object graph extraction module MD1$a$-2 for obtaining a plurality of object graphs $E_1$ to $E_n$ from the plurality of object features $O_1$ to $O_n$. For example, the object graph extraction module MD1$a$-2 may include an object graph extraction module MD1$a$-2 shown in FIG. 6. The processor 120 may obtain the plurality of object graphs $E_1$ to $E_n$ from the plurality of object features $O_1$ to $O_n$ by using the object graph extraction module MD1$a$-2. In the exemplary embodiment, the processor 120 may obtain the plurality of object graphs $E_1$ to $E_n$ corresponding to respective time points or time periods from the object features $O_1$ to $O_n$ corresponding to the respective time points or time periods by using the object graph extraction module MD1$a$-2. For example, the processor 120 may obtain an object graph $E_1$ corresponding to a first time point from an object feature $O_1$ corresponding to the first time point by using the object graph extraction module MD1$a$-2.

In the exemplary embodiment, the plurality of object graphs $E_1$ to $E_n$ may respectively correspond to the plurality of different time points or time periods. In the exemplary embodiment, the object graphs $E_1$ to $E_n$ may correspond to respective frames (i.e., time points). In another exemplary embodiment, object graphs $E_1$ to $E_n$ may respectively correspond to a plurality of consecutive frames (i.e., time periods). In a yet another exemplary embodiment, at least one or more of the plurality of object graphs $E_1$ to $E_n$ may correspond to respective frames (i.e., time points), and the remainders of the plurality of object graphs $E_1$ to $E_n$ may respectively correspond to a plurality of consecutive frames (i.e., time periods).

In the exemplary embodiment, the first visual feature extraction module MD1$a$ may include an object graph feature extraction module MD1$a$-3 for obtaining the plurality of first visual features $V_{a1}$ to $V_{an}$ from the plurality of object graphs $E_1$ to $E_n$. The processor 120 may obtain the plurality of first visual features $V_{a1}$ to $V_{an}$ from the plurality of object graphs $E_1$ to $E_n$ by using the object graph feature extraction module MD1$a$-3. For example, the object graph feature extraction module MD1$a$-3 may include a graph convolution layer. In the exemplary embodiment, the processor 120 may obtain the plurality of first visual features $V_{a1}$ to $V_{an}$ corresponding to respective time points or time periods from the object graphs $E_1$ to $E_n$ corresponding to the respective time points or time periods by using the object graph feature extraction module MD1$a$-3. For example, the processor 120 may obtain a first visual feature $V_{a1}$ corresponding to a first time point from an object graph $E_1$ corresponding to the first time point by using the object graph feature extraction module MD1$a$-3.

Figure 6:
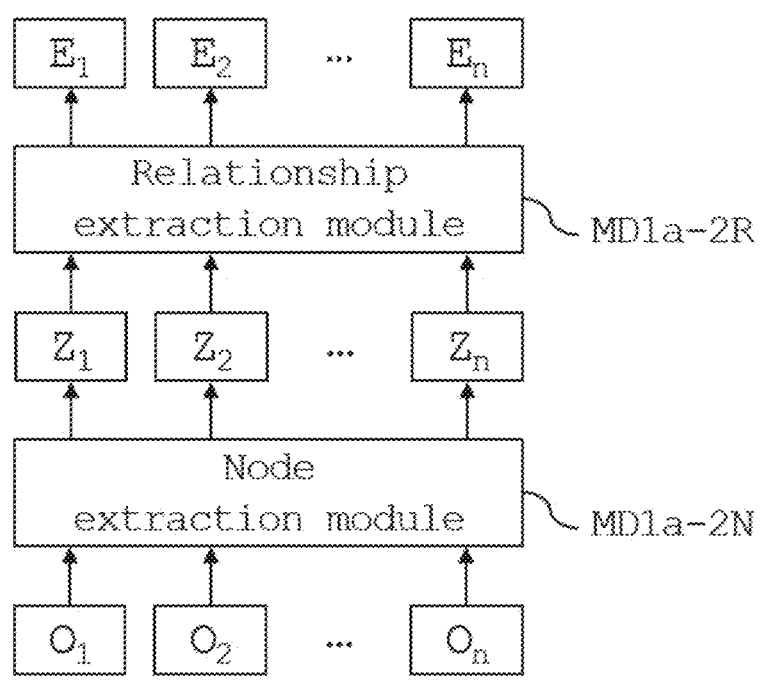
FIG. 6 is a conceptual diagram illustrating an object graph extraction module used in the electronic device according to the exemplary embodiments of the present disclosure.

FIG. 6 is a conceptual diagram illustrating an object graph extraction module used in the electronic device according to the exemplary embodiments of the present disclosure. Referring to FIG. 6, the object graph extraction module MD1$a$-2 may include a node extraction module MD1$a$-2N for obtaining a plurality of object graph node sets $Z_1$ to $Z_n$ from the plurality of object features $O_1$ to $O_n$, and a relationship extraction module MD1$a$-2R for obtaining the plurality of object graphs $E_1$ to $E_n$ by obtaining relationships between nodes in each of the object graph node sets $Z_1$ to $Z_n$ from the plurality of object graph node sets $Z_1$ to $Z_n$. The processor 120 may obtain the plurality of object graph node sets $Z_1$ to $Z_n$ from the plurality of object features $O_1$ to $O_n$ by using the node extraction module MD1$a$-2N, and may obtain the plurality of object graphs $E_1$ to $E_n$ by obtaining the relationships between the nodes in each of the object graph node sets $Z_1$ to $Z_n$ from the plurality of object graph node sets $Z_1$ to $Z_n$ by using the relationship extraction module MD1$a$-2R.

In the exemplary embodiment, the node extraction module MD1$a$-2N may include at least one of a transformer-based model and a convolutional network-based model. In the exemplary embodiment, the relationship extraction module MD1$a$-2R may include at least one of a transformer-based model and a convolutional network-based model.

In the exemplary embodiment, the processor 120 may obtain the object graph node sets $Z_1$ to $Z_n$ corresponding to respective time points or time periods from the object features $O_1$ to $O_n$ corresponding to the respective time points or time periods by using the node extraction module MD1$a$-2N. For example, the processor 120 may obtain an object graph node set $Z_1$ corresponding to a first time point from an object feature $O_1$ corresponding to the first time point by using the node extraction module MD1$a$-2N.

In the exemplary embodiment, the processor 120 may obtain the relationships between the nodes in the object graph node sets $Z_1$ to $Z_n$ corresponding to the respective time points or time periods from the object graph node sets $Z_1$ to $Z_n$ corresponding to the respective time points or time periods by using the relationship extraction module MD1$a$-2R, so as to obtain the object graphs $E_1$ to $E_n$ corresponding to the respective time points or time periods. For example, the processor 120 may obtain relationships between nodes in an object graph node set $Z_1$ corresponding to a first time point from an object graph node set $Z_1$ corresponding to the first time point by using the relationship extraction modules MD1$a$-2R, so as to obtain an object graph $E_1$ corresponding to the first time point.

Figure 7:
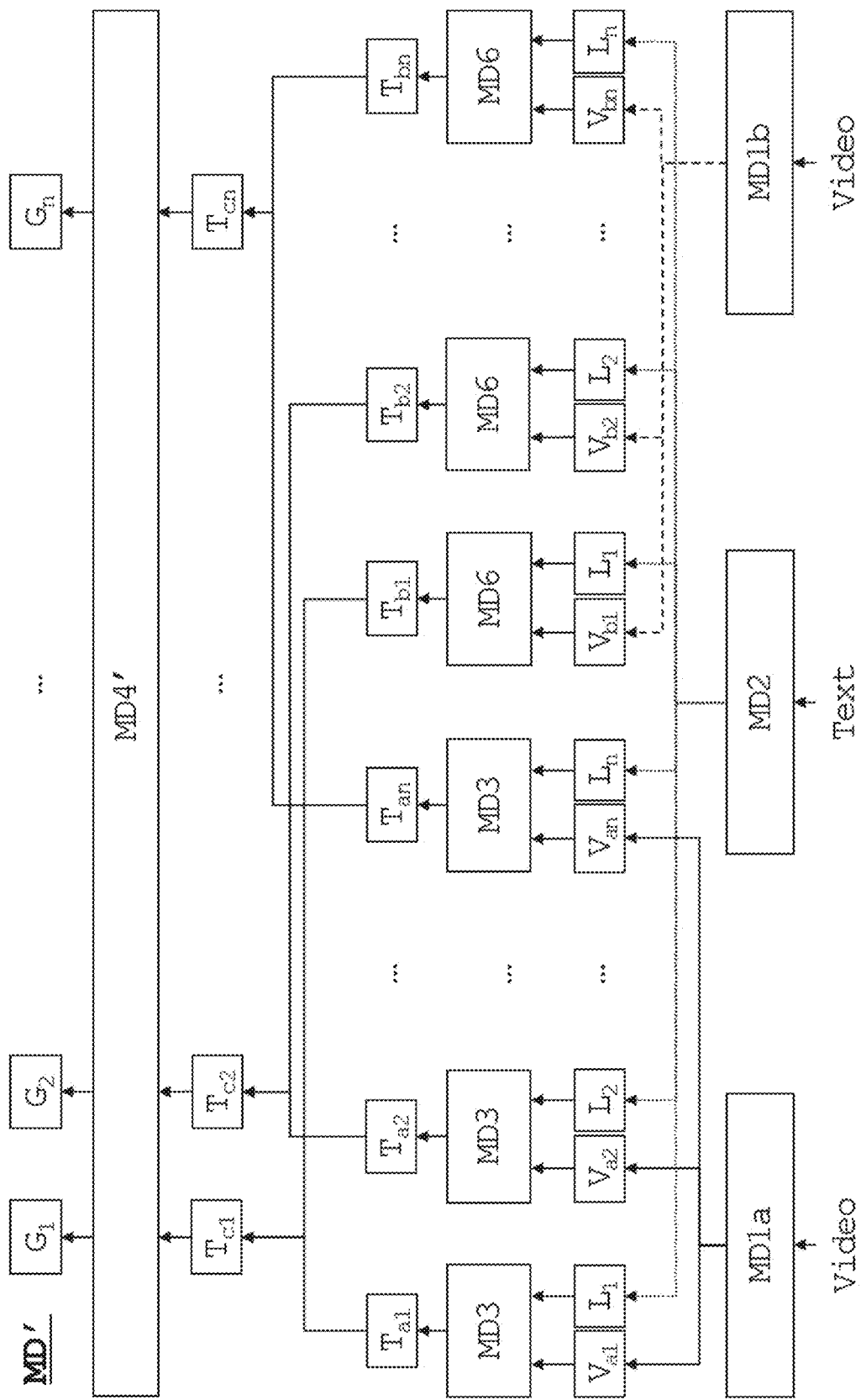
FIG. 7 is a conceptual diagram illustrating a multimodal temporal-axis fusion artificial intelligence model according to exemplary embodiments of the present disclosure.

FIG. 7 is a conceptual diagram illustrating a multimodal temporal-axis fusion artificial intelligence model according to exemplary embodiments of the present disclosure. Hereinafter, focusing on differences between the multimodal temporal-axis fusion artificial intelligence model MD shown in FIG. 2 and the multimodal temporal-axis fusion artificial intelligence model MD' shown in FIG. 7, the multimodal temporal-axis fusion artificial intelligence model MD' shown in FIG. 7 is described.

Referring to FIG. 7, the multimodal temporal-axis fusion artificial intelligence model MD' may further include: a second visual feature extraction module MD1$b$ for obtaining a plurality of second visual features $V_{b1}$ to $V_{bn}$ respectively corresponding to the plurality of different time points or time periods from the video; and a second local fusion module MD6 for obtaining a plurality of second local fusion features $T_{b1}$ to $T_{bn}$, respectively corresponding to the plurality of time points or time periods, from the plurality of second visual features $V_{b1}$ to $V_{bn}$ and the plurality of text features $L_1$ to $L_n$ by fusing the second visual features and the text features, which correspond to the same time point or time period. The processor 120 may obtain the plurality of second visual features $V_{b1}$ to $V_{bn}$ respectively corresponding to the plurality of time points or time periods from the video by using the second visual feature extraction module MD1$b$, and fuse the second visual features and the text features, which correspond to the same time point or time period, by using the second local fusion module MD6, so as to obtain the plurality of second local fusion features $T_{b1}$ to $T_{bn}$ respectively corresponding to the plurality of time points or time periods from the plurality of second visual features $V_{b1}$ to $V_{bn}$ and the plurality of text features $L_1$ to $L_n$.

The plurality of first visual features $V_{a1}$ to $V_{an}$ (see FIG. 2) and the plurality of second visual features $V_{b1}$ to $V_{bn}$ may be different from each other. For example, as described with reference to FIG. 5, the plurality of first visual features $V_{a1}$ to $V_{an}$ may be object graph-based visual features and the plurality of second visual features $V_{b1}$ to $V_{bn}$ may be appearance-based visual features. For example, the first visual feature extraction module MD1$a$ may include a Faster-RCNN, and the second visual feature extraction module MD1$b$ may include an ResNet. In the exemplary embodiment, the second local fusion feature module MD6 may have the same structure as that of the first local fusion module MD3, but may have different parameters. In another exemplary embodiment, the second local fusion feature module MD6 may have a different structure from that of the first local fusion module MD3.

The processor 120 may obtain a plurality of third local fusion features $T_{c1}$ to $T_{cn}$ from the plurality of first local fusion features $T_{a1}$ to $T_{an}$ and the plurality of second local fusion features $T_{b1}$ to $T_{bn}$. The third local fusion features $T_{c1}$ to $T_{cn}$ may correspond to respective time points or time periods. For example, the processor 120 may obtain the third local fusion features corresponding to the same time point or time period by concatenating, adding, or multiplying the first local fusion features and the second local fusion features, which correspond to the same time point or time period. For example, the processor 120 may obtain a third local fusion feature $T_{c1}$ corresponding to a first time point by concatenating, adding, or multiplying a first local fusion feature $T_{a1}$ and a second local fusion feature $T_{b1}$, which correspond to the first time point.

A global fusion module MD4' may obtain the at least one global fusion feature, e.g., the plurality of global fusion features $G_1$ to $G_n$, from the plurality of third local fusion features $T_{c1}$ to $T_{cn}$. The processor 120 may obtain the at least one global fusion feature, e.g., the plurality of global fusion features $G_1$ to $G_n$ from the plurality of third local fusion features $T_{c1}$ to $T_{cn}$ by using the global fusion module MD4'. As described with reference to FIG. 2, the global fusion module MD4' may include a self-attention layer.

Figure 8:
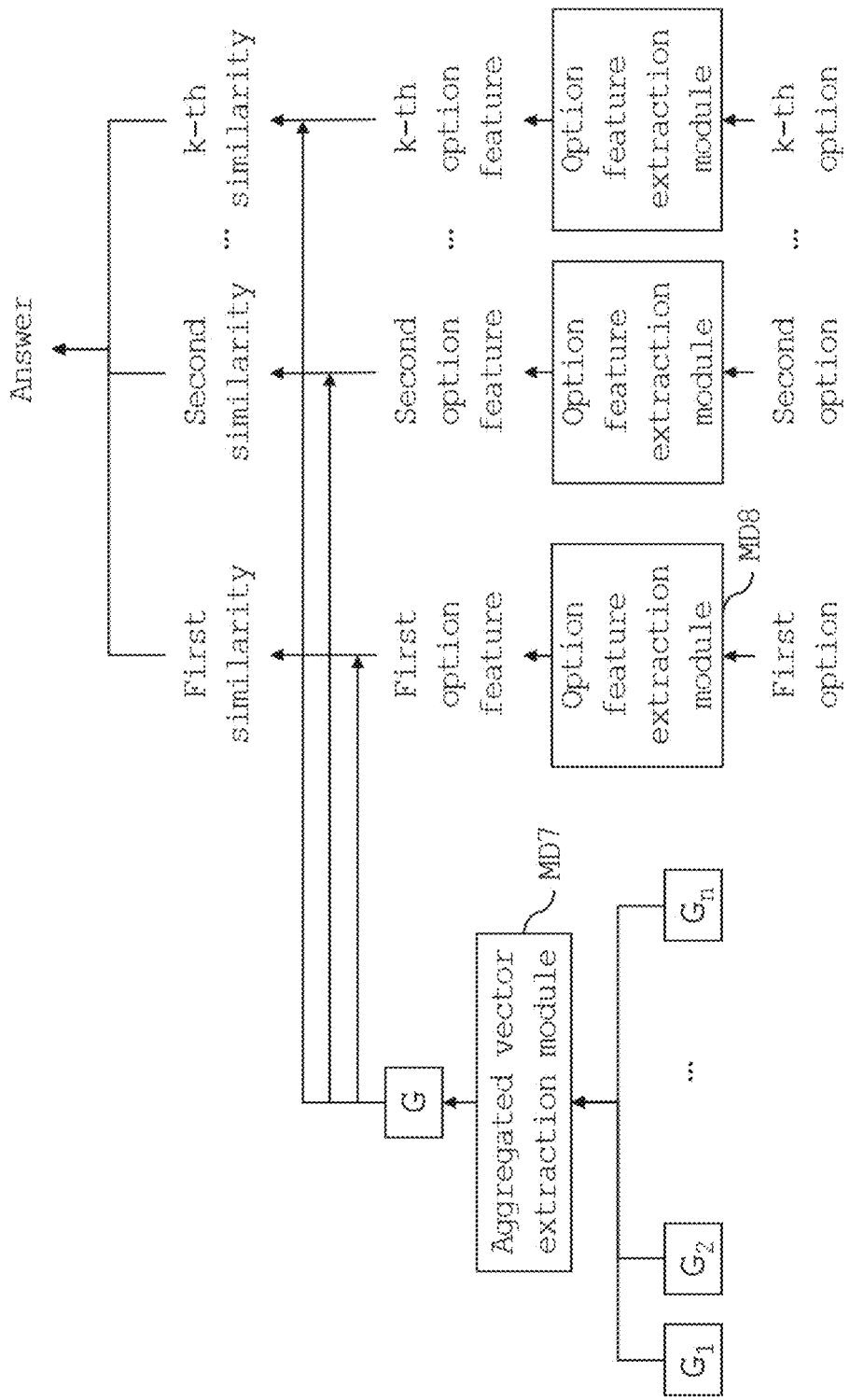
FIGS. 8 and 9 are conceptual diagrams illustrating the multimodal temporal-axis fusion artificial intelligence models according to the exemplary embodiments of the present disclosure.

FIG. 8 is a conceptual diagram illustrating the multimodal temporal-axis fusion artificial intelligence models according to the exemplary embodiments of the present disclosure. Referring to FIG. 8, the multimodal temporal-axis fusion artificial intelligence models MD and MD' may obtain an answer to a question by using the at least one global fusion feature, e.g., the plurality of global fusion features $G_1$ to $G_n$. The text may contain the question.

The multimodal temporal-axis fusion artificial intelligence models MD and MD' may include an aggregated vector extraction module MD7 for obtaining an aggregated vector G from the at least one global fusion feature, e.g., the plurality of global fusion features $G_1$ to $G_n$. The processor 120 may obtain the aggregated vector G from the at least one global fusion feature, e.g., the plurality of global fusion features $G_1$ to $G_n$ by using the aggregated vector extraction module MD7.

Each of the multimodal temporal-axis fusion artificial intelligence models MD and MD' may include an option feature extraction module MD8 for obtaining a plurality of option features respectively from a plurality of options. The processor 120 may obtain the plurality of option features respectively from the plurality of options by using the option feature extraction module MD8. In the exemplary embodiment, the option feature extraction module MD8 may include at least one of a BERT and an RoBERTa. In the exemplary embodiment, each of the option features may be a vector, matrix, or tensor.

The processor 120 may obtain the answer to the question expressed in text from the aggregated vector G and each option feature. For example, the processor 120 may obtain a similarity between the aggregated vector G and each option feature, and select an option having the highest similarity to the aggregated vector G as the answer. For example, the processor 120 may obtain a cosine similarity between the aggregated vector G and each option feature or a distance between the aggregated vector G and each option feature in order to obtain the similarity between the aggregated vector G and each option feature.

Figure 9:
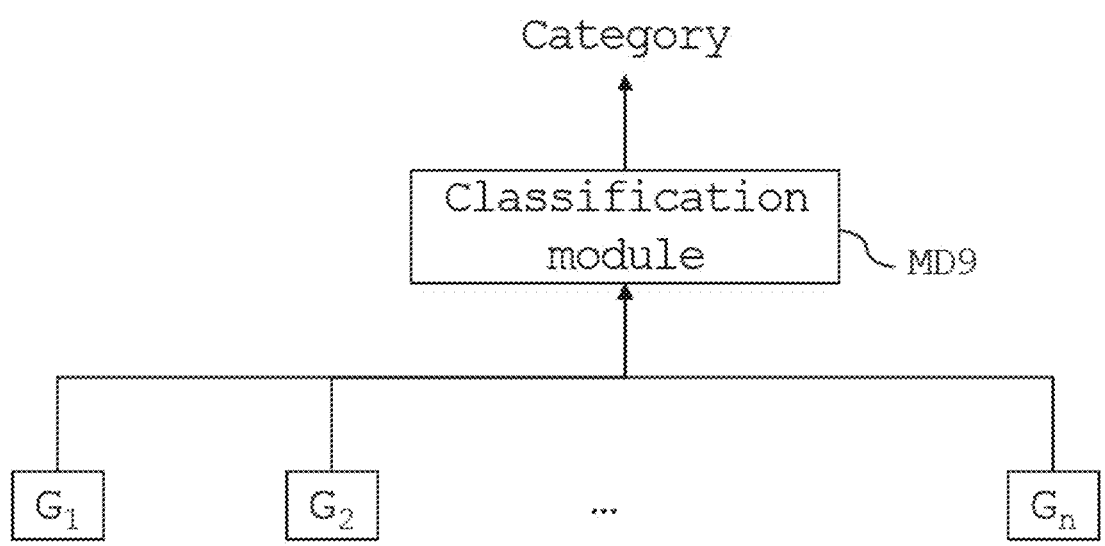

FIG. 9 is a conceptual diagram illustrating the multimodal temporal-axis fusion artificial intelligence models according to the exemplary embodiments of the present disclosure. Referring to FIG. 9, each of the multimodal temporal-axis fusion artificial intelligence models MD and MD' may further include a classification module MD9 for classifying a video by using the at least one global fusion feature, e.g., the plurality of global fusion features $G_1$ to $G_n$. The processor 120 may classify the video by using the classification module MD9 and the at least one global fusion feature, e.g., the plurality of global fusion features $G_1$ to $G_n$. In the exemplary embodiment, the processor 120 may classify the video by religion or political orientation. In the exemplary embodiment, the processor 120 may classify the video according to whether it is adult material or not, whether it is hate material or not, whether it is related to a specific issue or not, whether it is related to a specific brand or not, etc.

Figure 10:
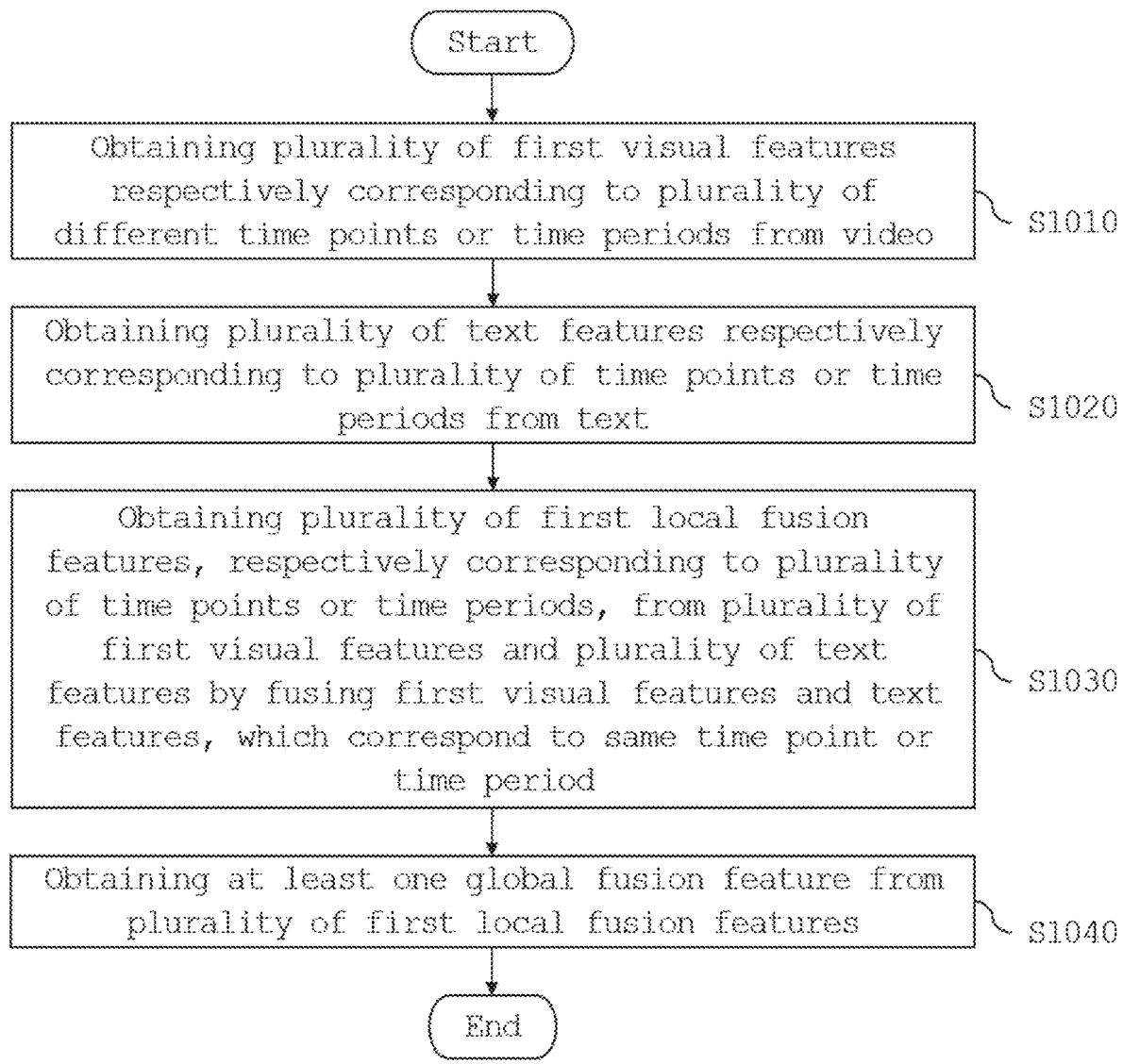
FIGS. 10 to 20 are flowcharts illustrating an operation method of an electronic device according to the exemplary embodiments of the present disclosure.

FIG. 10 is a flowchart illustrating an operation method of an electronic device according to the exemplary embodiments of the present disclosure. Referring to FIG. 10, the operation method of the electronic device may include: step S1010 of obtaining a plurality of first visual features respectively corresponding to a plurality of different time points or time periods from a video; step S1020 of obtaining a plurality of text features respectively corresponding to the plurality of time points or time periods from text; step S1030 of obtaining a plurality of first local fusion features, respectively corresponding to the plurality of time points or time periods, from the plurality of first visual features and the plurality of text features by fusing the first visual features and the text features, which correspond to the same time point or time period; and step S1040 of obtaining at least one global fusion feature from the plurality of first local fusion features.

Figure 11:
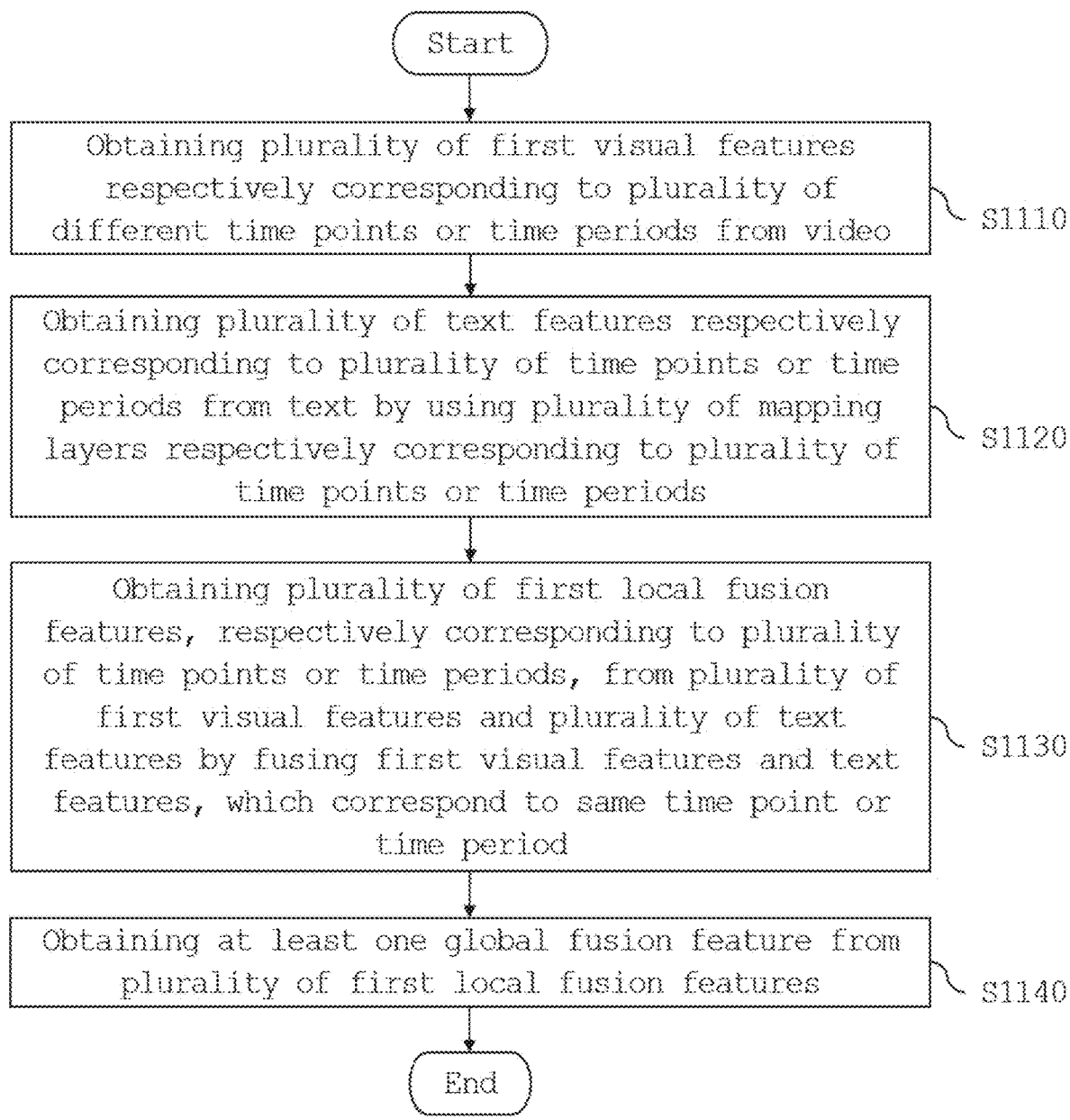

FIG. 11 is a flowchart illustrating the operation method of the electronic device according to the exemplary embodiments of the present disclosure. Referring to FIG. 11, the step S1020 of obtaining the plurality of text features (see FIG. 10) may include step S1120 of obtaining the plurality of text features respectively corresponding to the plurality of time points or time periods from the text by using a plurality of mapping layers respectively corresponding to the plurality of time points or time periods. Specifically, the operation method of the electronic device may include: step S1110 of obtaining a plurality of first visual features respectively corresponding to a plurality of different time points or time periods from a video; step S1120 of obtaining a plurality of text features respectively corresponding to the plurality of time points or time periods from text by using a plurality of mapping layers respectively corresponding to the plurality of time points or time periods; step S1130 of obtaining a plurality of first local fusion features, respectively corresponding to the plurality of time points or time periods, from the plurality of first visual features and the plurality of text features by fusing the first visual features and the text features, which correspond to the same time point or time period; and step S1140 of obtaining at least one global fusion feature from the plurality of first local fusion features.

Figure 12:
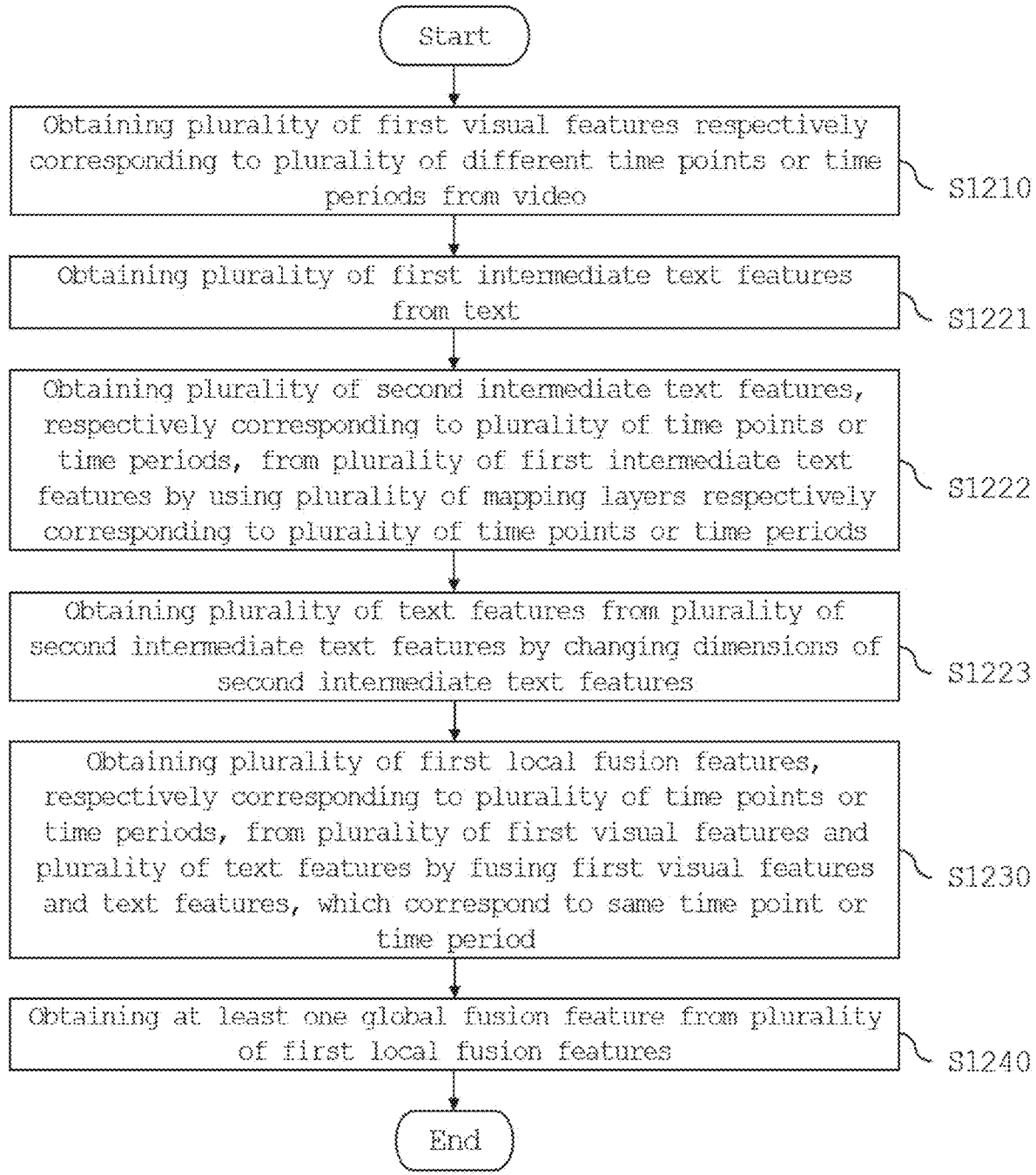

FIG. 12 is a flowchart illustrating the operation method of the electronic device according to the exemplary embodiments of the present disclosure. Referring to FIG. 12, the step S1020 of obtaining the plurality of text features (see FIG. 10) may include: step S1221 of obtaining a plurality of first intermediate text features from the text; step S1222 of obtaining a plurality of second intermediate text features respectively corresponding to the plurality of time points or time periods from the plurality of first intermediate text features by using a plurality of mapping layers respectively corresponding to the plurality of time points or time periods; and step S1223 of obtaining the plurality of text features from the plurality of second intermediate text features by changing dimensions of the second intermediate text features. In the exemplary embodiment, the number of the plurality of first intermediate text features may be different from the number of the plurality of second intermediate text features. In the exemplary embodiment, a dimension of each of the plurality of text features may be the same as a dimension of each of the plurality of first visual features.

Specifically, the operation method of the electronic device may include: step S1210 of obtaining a plurality of first visual features respectively corresponding to a plurality of different time points or time periods from a video; step S1221 of obtaining a plurality of first intermediate text features from text; step S1222 of obtaining a plurality of second intermediate text features, respectively corresponding to the plurality of time points or time periods, from the plurality of first intermediate text features by using a plurality of mapping layers respectively corresponding to the plurality of time points or time periods; step S1223 of obtaining a plurality of text features from the plurality of second intermediate text features by changing dimensions of the second intermediate text features; step S1230 of obtaining a plurality of first local fusion features, respectively corresponding to the plurality of time points or time periods, from the plurality of first visual features and the plurality of text features by fusing the first visual features and the text features, which correspond to the same time point or time period; and step S1240 of obtaining at least one global fusion feature from the plurality of first local fusion features.

Figure 13:
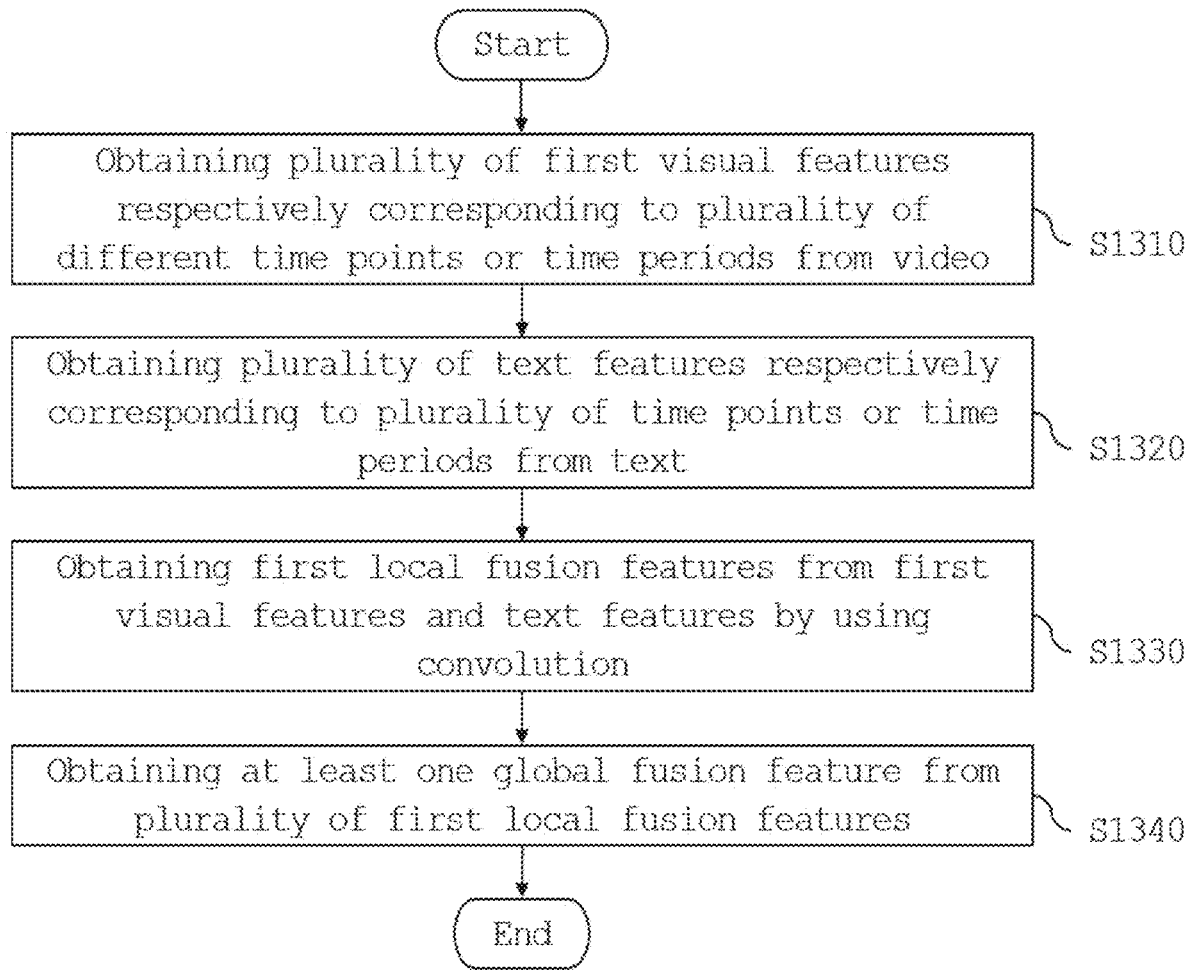

FIG. 13 is a flowchart illustrating the operation method of the electronic device according to the exemplary embodiments of the present disclosure. Referring to FIG. 13, the step S1030 of obtaining the plurality of first local fusion features (see FIG. 10) may include step S1330 of obtaining the first local fusion features from the first visual features and the text features by using convolution. Specifically, the operation method of the electronic device may include: step S1310 of obtaining a plurality of first visual features respectively corresponding to a plurality of different time points or time periods from a video; step S1320 of obtaining a plurality of text features respectively corresponding to the plurality of time points or time periods from text; step S1330 of obtaining first local fusion features from the first visual features and the text features by using convolution; and step S1340 of obtaining at least one global fusion feature from the plurality of first local fusion features.

Figure 14:
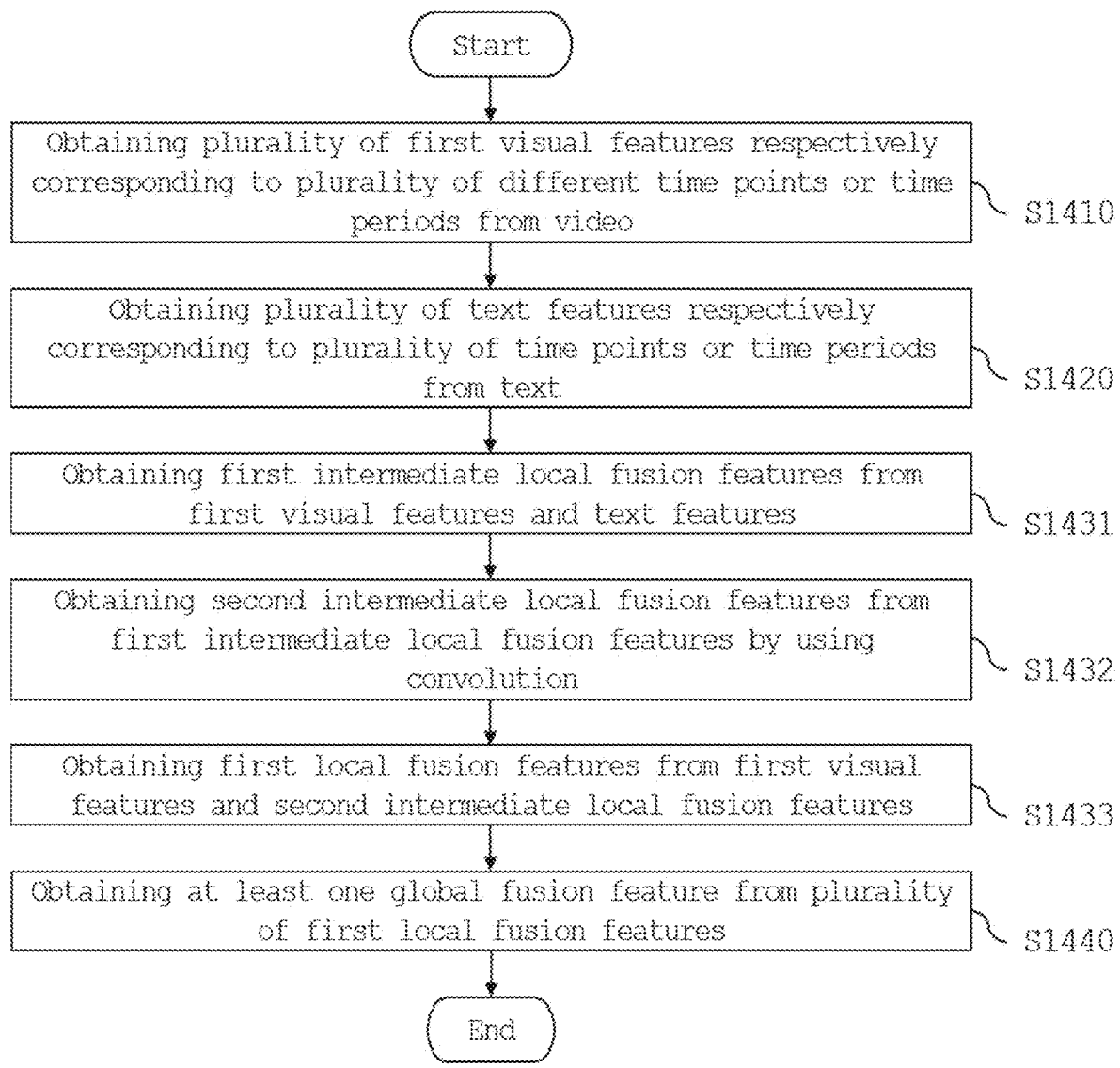

FIG. 14 is a flowchart illustrating the operation method of the electronic device according to the exemplary embodiments of the present disclosure. Referring to FIG. 14, the step S1030 of obtaining the plurality of first local fusion features (see FIG. 10) may include: step S1431 of obtaining first intermediate local fusion features from the first visual features and the text features; step S1432 of obtaining second intermediate local fusion features from the first intermediate local fusion features by using convolution; and step S1433 of obtaining the first local fusion features from the first visual features and the second intermediate local fusion features. Specifically, the operation method of the electronic device may include: step S1410 of obtaining a plurality of first visual features respectively corresponding to a plurality of different time points or time periods from a video; step S1420 of obtaining a plurality of text features respectively corresponding to the plurality of time points or time periods from text; step S1431 of obtaining first intermediate local fusion features from the first visual features and the text features; step S1432 of obtaining second intermediate local fusion features from the first intermediate local fusion features by using convolution; step S1433 of obtaining first local fusion features from the first visual features and the second intermediate local fusion features; and step S1440 of obtaining at least one global fusion feature from the plurality of first local fusion features.

Figure 15:
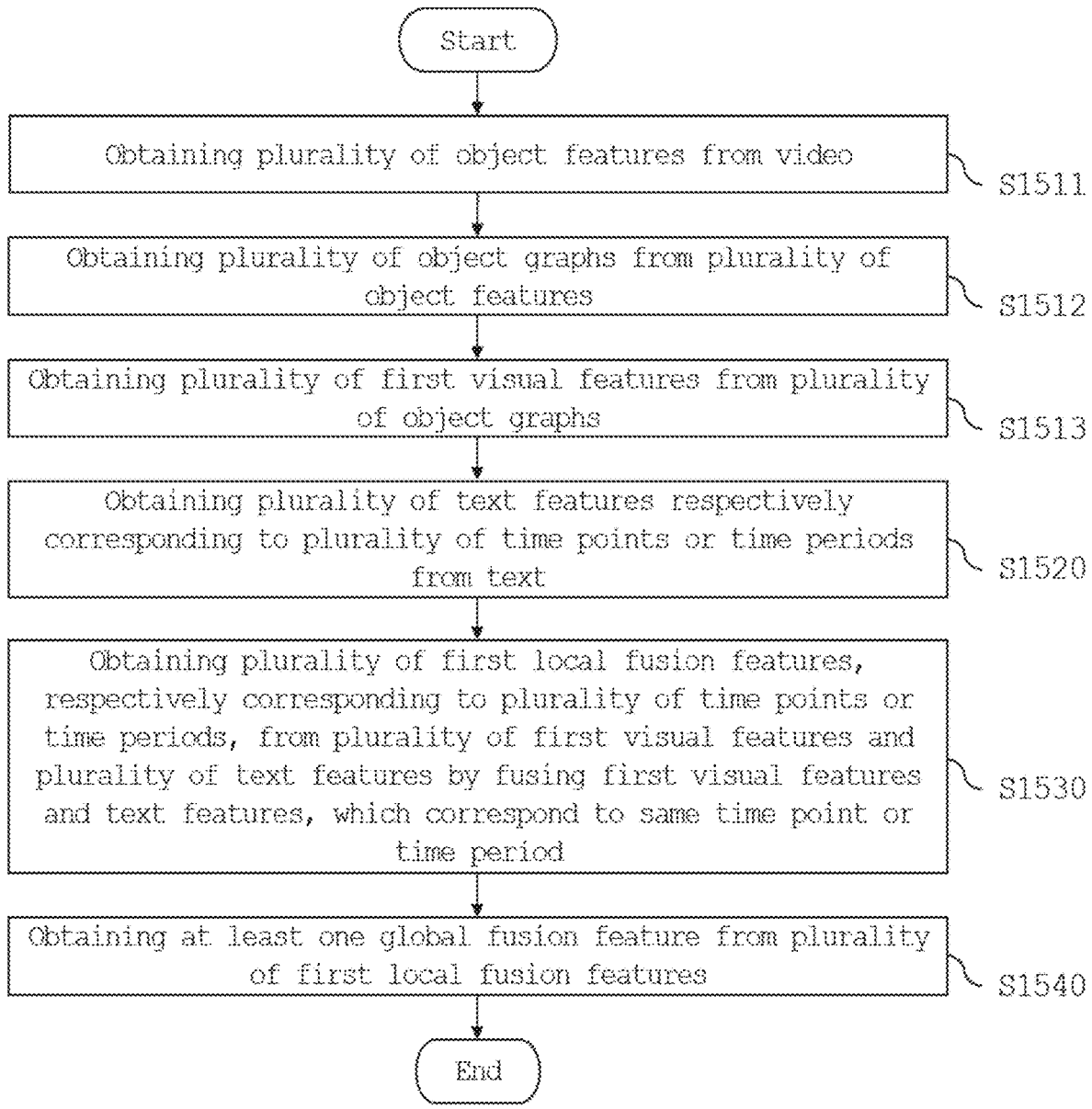

FIG. 15 is a flowchart illustrating the operation method of the electronic device according to the exemplary embodiments of the present disclosure. Referring to FIG. 15, the step S1010 of obtaining the plurality of first visual features (see FIG. 10) may include: step S1511 of obtaining a plurality of object features from a video; step S1512 of obtaining a plurality of object graphs from the plurality of object features; and step S1513 of obtaining the plurality of first visual features from the plurality of object graphs. Specifically, the operation method of the electronic device may include: step S1511 of obtaining a plurality of object features from a video; step S1512 of obtaining a plurality of object graphs from the plurality of object features; step S1513 of obtaining a plurality of first visual features from the plurality of object graphs; step S1520 of obtaining a plurality of text features respectively corresponding to a plurality of time points or time periods from text; step S1530 of obtaining a plurality of first local fusion features, respectively corresponding to the plurality of time points or time periods, from the plurality of first visual features and the plurality of text features by fusing the first visual features and the text features, which correspond to the same time point or time period; and step S1540 of obtaining at least one global fusion feature from the plurality of first local fusion features.

Figure 16:
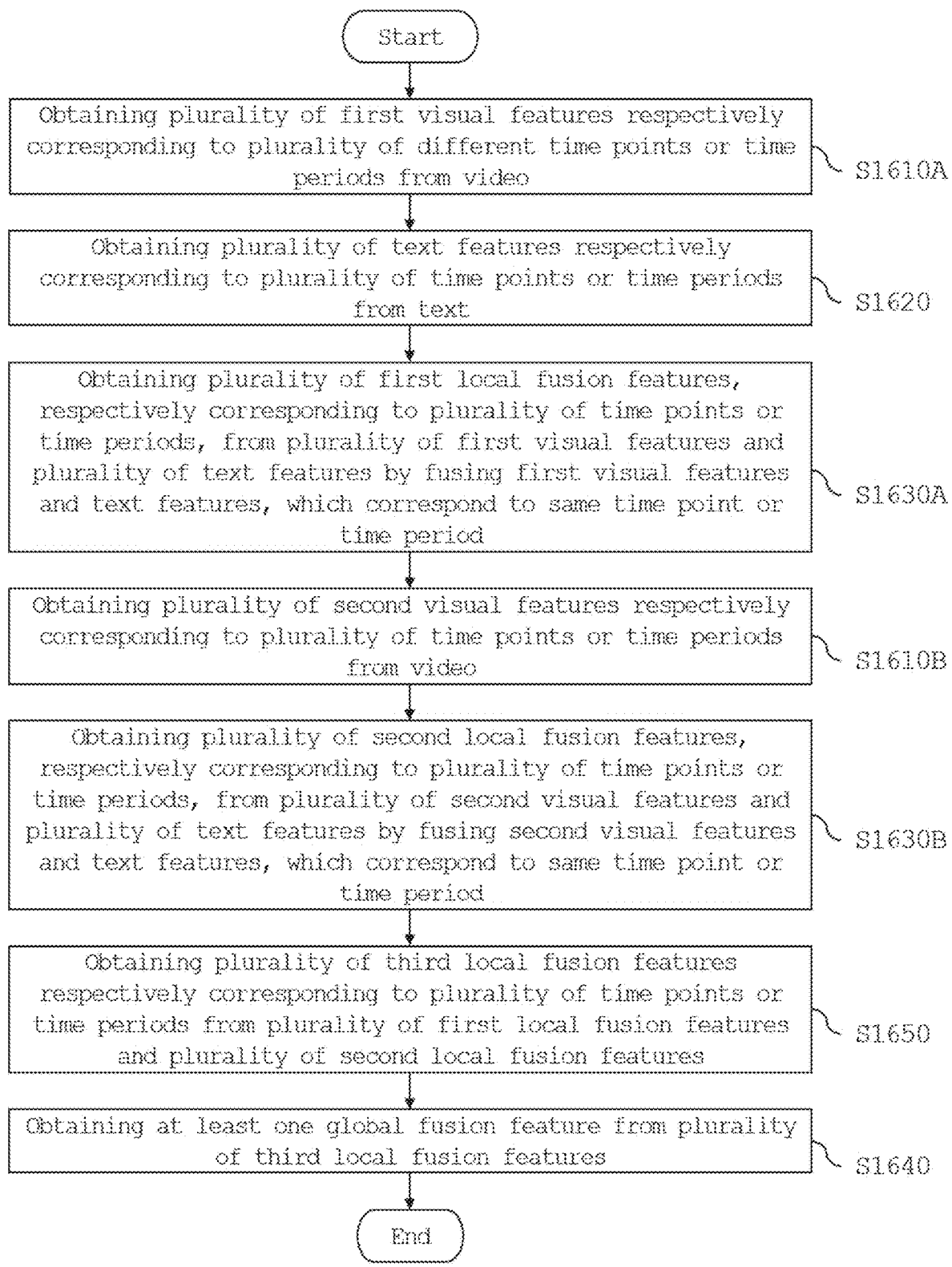

FIG. 16 is a flowchart illustrating the operation method of the electronic device according to the exemplary embodiments of the present disclosure. Referring to FIG. 16, the operation method of the electronic device may further include: step S1610B of obtaining a plurality of second visual features respectively corresponding to the plurality of time points or time periods from the video; step S1630B of obtaining a plurality of second local fusion features, respectively corresponding to the plurality of time points or time periods, from the plurality of second visual features and the plurality of text features by fusing the second visual features and the text features, which correspond to the same time point or time period; and step S1650 of obtaining a plurality of third local fusion features respectively corresponding to the plurality of time points or time periods from the plurality of first local fusion features and the plurality of second local fusion features, and the step S1040 of obtaining the at least one global fusion feature (see FIG. 10) may include step S1640 of obtaining the at least one global fusion feature from the plurality of third local fusion features.

Specifically, the operation method of the electronic device may include: step S1610A of obtaining a plurality of first visual features respectively corresponding to a plurality of different time points or time periods from a video; step S1620 of obtaining a plurality of text features respectively corresponding to the plurality of time points or time periods from text; step S1630A of obtaining a plurality of first local fusion features, respectively corresponding to the plurality of time points or time periods, from the plurality of first visual features and the plurality of text features by fusing the first visual features and the text features, which correspond to the same time point or time period; step S1610B of obtaining a plurality of second visual features respectively corresponding to the plurality of time points or time periods from the video; step S1630B of obtaining a plurality of second local fusion features, respectively corresponding to the plurality of time points or time periods, from the plurality of second visual features and the plurality of text features by fusing the second visual features and the text features, which correspond to the same time point or time period; step S1650 of obtaining a plurality of third local fusion features respectively corresponding to the plurality of time points or time periods from the plurality of first local fusion features and the plurality of second local fusion features; and step S1640 of obtaining at least one global fusion feature from the plurality of third local fusion features.

Figure 17:
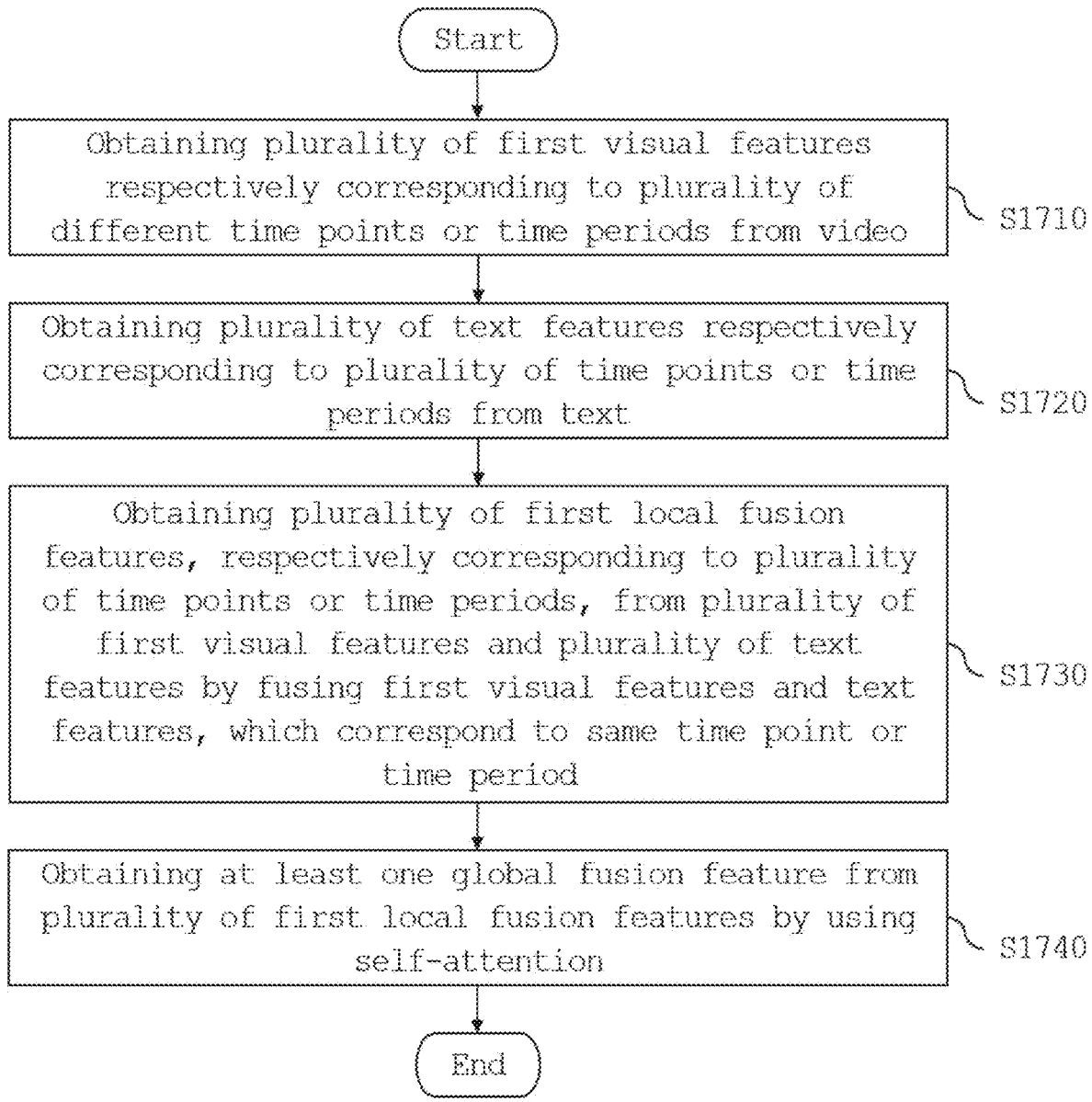

FIG. 17 is a flowchart illustrating the operation method of the electronic device according to the exemplary embodiments of the present disclosure. Referring to FIG. 17, the step S1040 of obtaining the at least one global fusion feature (see FIG. 10) may include step S1740 of obtaining the at least one global fusion feature from the plurality of first local fusion features by using self-attention. Specifically, the operation method of the electronic device may include: step S1710 of obtaining a plurality of first visual features respectively corresponding to a plurality of different time points or time periods from a video; step S1720 of obtaining a plurality of text features respectively corresponding to the plurality of time points or time periods from text; step S1730 of obtaining a plurality of first local fusion features, respectively corresponding to the plurality of time points or time periods, from the plurality of first visual features and the plurality of text features by fusing the first visual features and the text features, which correspond to the same time point or time period; and step S1740 of obtaining at least one global fusion feature from the plurality of first local fusion features by using self-attention.

Figure 18:
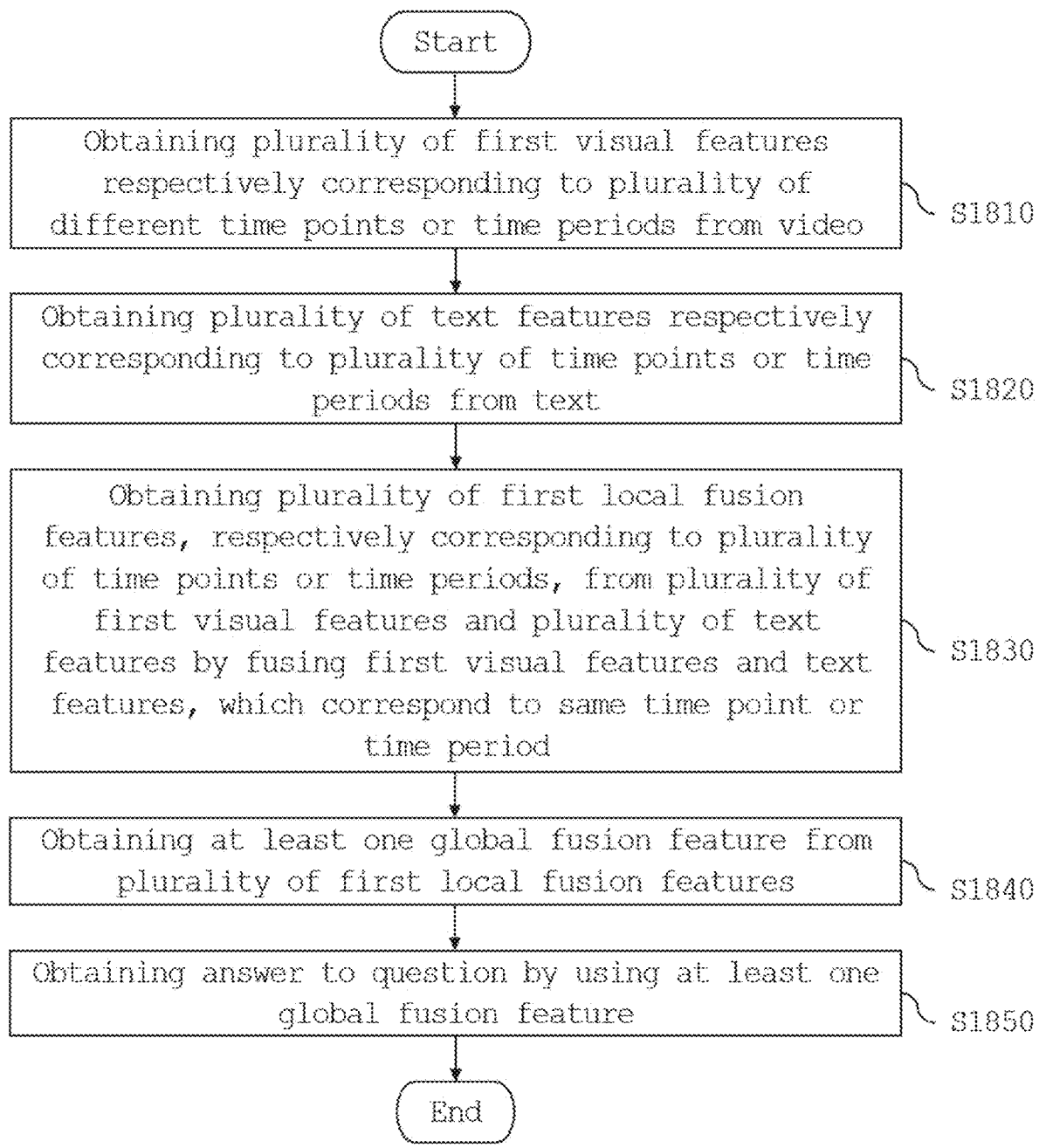

FIG. 18 is a flowchart illustrating the operation method of the electronic device according to the exemplary embodiments of the present disclosure. Text in FIG. 18 may contain a question. Referring to FIG. 18, the operation method of the electronic device may further include step S1850 of obtaining an answer to the question by using the at least one global fusion feature. Specifically, the operation method of the electronic device may include: step S1810 of obtaining a plurality of first visual features respectively corresponding to a plurality of different time points or time periods from a video; step S1820 of obtaining a plurality of text features respectively corresponding to the plurality of time points or time periods from text; step S1830 of obtaining a plurality of first local fusion features, respectively corresponding to the plurality of time points or time periods, from the plurality of first visual features and the plurality of text features by fusing the first visual features and the text features, which correspond to the same time point or time period; step S1840 of obtaining at least one global fusion feature from the plurality of first local fusion features; and step S1850 of obtaining an answer to a question by using the at least one global fusion feature.

Figure 19:
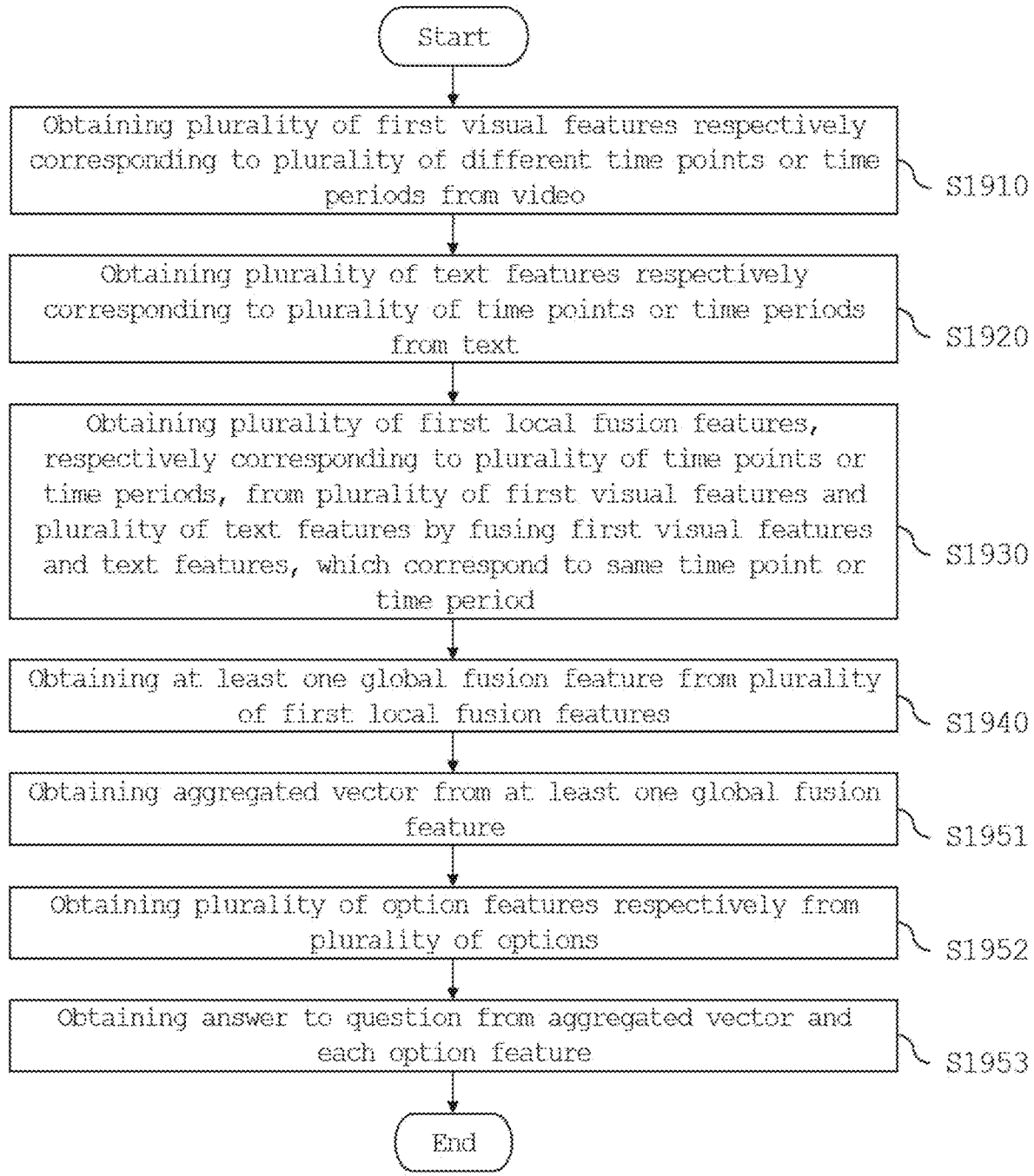

FIG. 19 is a flowchart illustrating the operation method of the electronic device according to the exemplary embodiments of the present disclosure. At least one global fusion feature in FIG. 19 may include a plurality of global fusion features. Referring to FIG. 19, the step S1850 of obtaining the answer to the question (see FIG. 18) may include: step S1951 of obtaining an aggregated vector from the at least one global fusion feature; step S1952 of obtaining a plurality of option features respectively from a plurality of options; and step S1953 of obtaining the answer to the question from the aggregated vector and each option feature. Specifically, the operation method of the electronic device may include: step S1910 of obtaining a plurality of first visual features respectively corresponding to a plurality of different time points or time periods from a video; step S1920 of obtaining a plurality of text features respectively corresponding to the plurality of time points or time periods from text; step S1930 of obtaining a plurality of first local fusion features, respectively corresponding to the plurality of time points or time periods, from the plurality of first visual features and the plurality of text features by fusing the first visual features and the text features, which correspond to the same time point or time period; step S1940 of obtaining at least one global fusion feature from the plurality of first local fusion features; step S1951 of obtaining an aggregated vector from the at least one global fusion feature; step S1952 of obtaining a plurality of option features respectively from a plurality of options; and step S1953 of obtaining an answer to a question from the aggregated vector and each option feature.

Figure 20:
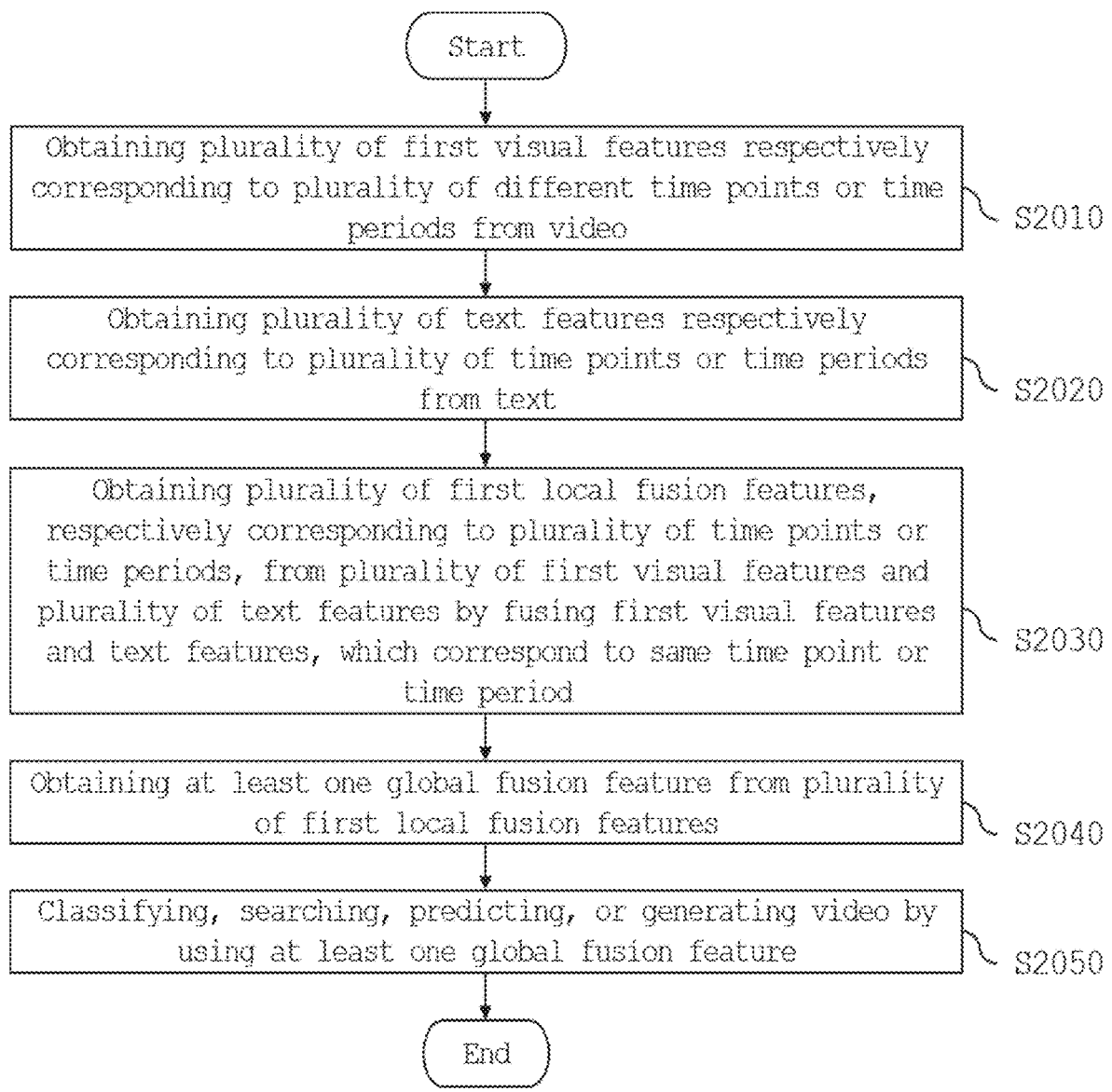

FIG. 20 is a flowchart illustrating the operation method of the electronic device according to the exemplary embodiments of the present disclosure. Referring to FIG. 20, the operation method of the electronic device may further include step S2050 of classifying, searching, predicting, or generating the video by using the at least one global fusion feature. Specifically, the operation method of the electronic device may include: step S2010 of obtaining a plurality of first visual features respectively corresponding to a plurality of different time points or time periods from a video; step S2020 of obtaining a plurality of text features respectively corresponding to the plurality of time points or time periods from text; step S2030 of obtaining a plurality of first local fusion features, respectively corresponding to the plurality of time points or time periods, from the plurality of first visual features and the plurality of text features by fusing the first visual features and the text features, which correspond to the same time point or time period; step S2040 of obtaining at least one global fusion feature from the plurality of first local fusion features; and step S2050 of classifying, searching, predicting, or generating the video by using the at least one global fusion feature.

Exemplary Embodiments and Comparative Examples

First exemplary embodiment: as shown in FIG. 7, object graph-based first visual features and appearance-based second visual features are used.

Second exemplary embodiment: as shown in FIG. 2, object graph-based visual features are used as first visual features, and appearance-based visual features are not used.

Third exemplary embodiment: as shown in FIG. 2, appearance-based visual features are used as first visual features, and object graph-based visual features are not used.

Fourth exemplary embodiment: motion-based third visual features are additionally used along with object graph-based first visual features and appearance-based second visual features.

Fifth exemplary embodiment: first visual features obtained by using a method of VGT (Xiao et al., Video graph transformer for video question answering, ECCV 2022) are used, and second visual features are not used. Both local fusion and global fusion are performed.

First comparative example: HME (Fan et al., Heterogeneous memory enhanced multimodal attention model for video question answering, CVPR 2019)

Second comparative example: CoMem (Gao et al., Motion-appearance co-memory networks for video question answering, CVPR 2018)

Third comparative example: HCRN (Le et al., Hierarchical conditional relation networks for video question answering, CVPR 2020)

Fourth comparative example: HGA (Jiang et al., Reasoning with heterogeneous graph alignment for video question answering, AAAI 2020)

Fifth comparative example: B2A (Park et al., Bridge to answer: Structure-aware graph interaction network for video question answering, CVPR 2021)

Sixth comparative example: IGV (Li et al., Invariant grounding for video question answering, CVPR 2022)

Seventh comparative example: MHN (Peng et al., Multilevel hierarchical network with multi-scale sampling for video question answering, arXiv 2022)

Eighth comparative example: VGT

Ninth comparative example: HQGA (Xiao et al., Video as conditional graph hierarchy for multi-granular question answering, AAAI 2022)

Tenth comparative example: ML (an answer with the highest frequency of occurrence is selected)

Eleventh comparative example: PSAC (Li et al., Beyond rnns: Positional self-attention with co-attention for video question answering, AAAI 2019)

Twelfth comparative example: global fusion is performed by using an attention module and visual feature vectors obtained by using VGT.

Thirteenth comparative example: both local fusion and global fusion are performed by using an attention module and visual feature vectors obtained by using VGT.

Fourteenth comparative example: first visual features obtained by using VGT are used, and second visual features are not used. Global fusion is performed.

Fifteenth comparative example: appearance-based second visual features are used, and object graph-based first visual features are not used. A plurality of text features $L_1$ to $L_n$ is identical to each other.

[Evaluation Dataset]

Causal-VidQA: Wang et al., Causal attention for unbiased visual recognition, ICCV 2021

NExT-QA: Xiao et al., Next-qa: Next phase of question-answering to explaining temporal actions, CVPR 2021

MSVD-QA: Xu et al., Video question answering via gradually refined attention over appearance and motion, ACM international conference on Multimedia 2017

AGQA-2.0: Grunde-McLaughlin et al., Agqa 2.0: An updated benchmark for compositional spatio-temporal reasoning, arXiv 2022

Comparison with Related Art

Referring to Table 1 below, the first exemplary embodiment showed higher performance than the first to fifth comparative examples on the Causal-VidQA dataset. In Table 1 below, $ACC_D$ indicates answer accuracy for descriptive problem types, $ACC_E$ indicates answer accuracy for explanatory problem types, $ACC_P$ indicates answer accuracy for predictive problem types, $ACC_C$ indicates answer accuracy for counterfactual problem types, and $ACC_A$ indicates the overall accuracy for the dataset. In particular, the first exemplary embodiment showed high performance improvement for the predictive problem types and counterfactual problem types.

TABLE 1

| | Causal-VidQA (Test) | | | | |
| --- | --- | --- | --- | --- | --- |
| | ACC$_D$ | ACC$_E$ | ACC$_P$ | ACC$_C$ | ACC$_A$ |
| First comparative example | 63.36 | 61.44 | 28.91 | 30.92 | 46.16 |
| Second comparative example | 64.08 | 62.79 | 31.40 | 32.54 | 47.70 |
| Third comparative example | 65.35 | 61.61 | 32.56 | 32.65 | 48.04 |
| Fourth comparative example | 65.66 | 63.51 | 32.21 | 34.27 | 48.91 |
| Fifth comparative example | 66.21 | 62.92 | 31.14 | 35.16 | 48.86 |
| First exemplary embodiment | 72.02 | 71.59 | 39.63 | 42.78 | 56.51 |

Referring to Table 2 below, Test-C indicates answer accuracy for causal question types of the NExT-QA dataset, Test-T of the NExT-QA dataset indicates answer accuracy for temporal question types. Test-D of the NExT-QA dataset indicates answer accuracy for descriptive question types, and Test-A indicates the overall accuracy for the NExT-QA dataset. The overall accuracy of the first exemplary embodiment was higher than those of the first comparative example and the sixth to ninth comparative examples. In addition, for the MSVD-QA dataset, the first exemplary embodiment showed higher performance than those of the first comparative example and the sixth to ninth comparative examples.

TABLE 2

| | NExT-QA | | | | MSVD-QA |
| --- | --- | --- | --- | --- | --- |
| | Test-C | Test-T | Test-D | Test-A | Test |
| First comparative example | 46.76 | 48.89 | 57.37 | 49.16 | — |
| Sixth comparative example | 48.56 | 51.67 | 59.64 | 51.34 | 40.8 |
| Seventh comparative example | — | — | — | — | 40.4 |
| Eighth comparative example | 51.62 | 51.94 | 63.65 | 53.68 | 40.3 |
| Ninth comparative example | 49.04 | 52.28 | 59.43 | 51.75 | 41.2 |
| First exemplary embodiment | 51.78 | 52.05 | 63.63 | 53.81 | 41.35 |

Referring to Table 3 below, the accuracy performance of the tenth comparative example, the eleventh comparative example, the first comparative example, the third comparative example, and the first exemplary embodiment by problem type of the AGQA v 2.0 dataset was evaluated (in Table 3, obj: object, rel: relationship, act: action, comp: comparison, recog: recognition). The performance with respect to all problems of the first exemplary embodiment was higher than the performance with respect to all the problems of the tenth comparative example, the eleventh comparative example, the first comparative example, and the third comparative example. In particular, the first exemplary embodiment showed significant performance improvement for question types of action recognition compared to those of the tenth comparative example, the eleventh comparative example, the first comparative example, and the third comparative example.

TABLE 3

| | | AGQA v2.0 | | | | |
| --- | --- | --- | --- | --- | --- | --- |
| | | Tenth comparative example | Eleventh comparative example | First comparative example | Third comparative example | First exemplary embodiment |
| Reas | Obj-rel | 9.39 | 37.84 | 37.45 | 40.33 | 43.1 |
| | Rel-act | 50 | 49.95 | 49.9 | 49.86 | 49.78 |
| | Obj-act | 50 | 50 | 49.97 | 49.85 | 50.05 |
| | Superlative | 21.01 | 33.2 | 33.21 | 33.55 | 35.4 |
| | Sequencing | 49.78 | 49.78 | 49.77 | 49.7 | 49.77 |
| | Exists | 50 | 49.94 | 49.96 | 50.01 | 50.42 |
| | Dur comp | 24.27 | 45.21 | 47.03 | 43.84 | 47.54 |
| | Act recog | 5.52 | 4.14 | 5.43 | 5.52 | 11.5 |
| Semantic | Object | 9.17 | 37.97 | 37.55 | 40.4 | 43.04 |
| | Relation | 50 | 49.95 | 49.99 | 49.96 | 50.37 |
| | Action | 30.11 | 46.85 | 47.58 | 46.41 | 47.83 |
| Structure | Query | 13.05 | 31.63 | 31.01 | 36.34 | 39.69 |
| | Compare | 50 | 49.49 | 49.71 | 49.22 | 49.74 |
| | Choose | 50 | 46.56 | 46.42 | 43.42 | 46.53 |
| | Logic | 50 | 49.96 | 49.87 | 50.02 | 50.06 |
| | Verify | 50 | 49.9 | 49.96 | 50.01 | 51.11 |
| Overall | | 10.99 | 40.18 | 39.89 | 42.11 | 44.36 |

[Effect of Multi-Level Fusion]

Referring to Table 4 below, the performance of the twelfth comparative example to the fourteenth comparative example and the fifth exemplary embodiment were compared to each other to confirm the effect of multi-level fusion including local fusion and global fusion. In Table 4 below, $ACC_D$ indicates answer accuracy for descriptive problem types, $ACC_E$ indicates answer accuracy for explanatory problem types, $ACC_P$ indicates answer accuracy for predictive problem types, $ACC_C$ indicates answer accuracy for counterfactual problem types, and $ACC_A$ indicates the overall accuracy for the dataset. The twelfth comparative example and the thirteenth comparative example use the same visual feature vectors and the same attention module, but the twelfth comparative example performs only global fusion, and the thirteenth comparative example performs both local fusion and global fusion. Meanwhile, the fourteenth comparative example and the fifth exemplary embodiment use the same visual feature vectors and the same artificial intelligence model MD (see FIG. 2), but the fourteenth comparative example performs only global fusion, and the fifth exemplary embodiment performs both local fusion and global fusion. Considering that the overall performance of the thirteenth comparative example is higher than that of the twelfth comparative example and that the overall performance of the fifth exemplary embodiment is higher than that of the fourteenth comparative example, it may be seen that compared to performing only the global fusion, the multi-level fusion combining the local fusion and the global fusion contributes to performance improvement. In particular, it may be seen that the multi-level fusion may play an important role in improving performance for the predictive question types (in $ACC_P$).

TABLE 4

Causal-VidQA (Test)

| | $ACC_D$ | $ACC_E$ | $ACC_P$ | $ACC_C$ | $ACC_A$ |
|---|---|---|---|---|---|
| Twelfth comparative example | 72.24 | 70.95 | 37.77 | 42.49 | 55.86 |
| Thirteenth comparative example | 71.61 | 71.09 | 39.12 | 42.45 | 56.07 |
| Fourteenth comparative example | 70.16 | 68.98 | 34.81 | 40.83 | 53.69 |
| Fifth exemplary embodiment | 72.02 | 71.59 | 39.63 | 42.78 | 56.51 |

[Effect of Visual Features]

Referring to Table 5 below, the second exemplary embodiment uses object graph-based visual features, the third exemplary embodiment uses appearance-based visual features, the first exemplary embodiment uses object graph-based first visual features and appearance-based second visual features, and the fourth exemplary embodiment uses object graph-based first visual features, appearance-based second visual features, and motion-based third visual features. Test-C indicates answer accuracy for causal question types of the NExT-QA dataset, Test-T of the NExT-QA dataset indicates answer accuracy for temporal question types, Test-D of the NExT-QA dataset indicates answer accuracy for descriptive question types, and Test-A indicates the overall accuracy of the NExT-QA dataset. From Table 5, it may be confirmed that the first to fourth exemplary embodiments showed satisfactory performance for various types of visual features. Therefore, it may be seen that the present disclosure is not limited by the visual feature extraction modules MD1a and MD1b or the types of visual features.

TABLE 5

NExT-QA

| | Test-C | Test-T | Test-D | Test-A |
|---|---|---|---|---|
| Second exemplary embodiment | 49.76 | 51.04 | 61.07 | 52.01 |
| Third exemplary embodiment | 50.49 | 51.34 | 62.56 | 52.73 |
| First exemplary embodiment | 51.78 | 52.05 | 63.63 | 53.81 |
| Fourth exemplary embodiment | 51.13 | 52.31 | 63.91 | 53.60 |

[Temporal-Axis Extension of Text Features]

Referring to Table 6 below, the fifteenth comparative example uses the same text feature for all time points or time periods by using a method of copying one text feature multiple times, whereas the third exemplary embodiment uses a plurality of different text features respectively corresponding to a plurality of time points or time periods. In Table 6 below, $ACC_D$ indicates answer accuracy for descriptive problem types, $ACC_E$ indicates answer accuracy for explanatory problem types, $ACC_P$ indicates answer accuracy for predictive problem type, $ACC_C$ indicates answer accuracy for counterfactual problem types, and $ACC_A$ indicates the overall accuracy for the Causal-VidQA dataset.

In terms of the overall performance of $ACC_A$, the third exemplary embodiment showed superior performance than that of the fifteenth comparative example. Therefore, it may be seen that a method for the temporal-axis extension of text features according to the present disclosure, the method extracting different text features for each time, contributes to performance improvement.

In particular, the third exemplary embodiment showed higher performance improvement for the counterfactual problem types (in $ACC_C$) than that of the fifteenth comparative example.

TABLE 6

Causal-VidQA (Test)

| Method | $ACC_D$ | $ACC_E$ | $ACC_P$ | $ACC_c$ | $ACC_A$ |
|---|---|---|---|---|---|
| Fifteenth comparative example | 67.01 | 62.37 | 33.32 | 30.91 | 48.40 |
| Third exemplary embodiment | 71.91 | 69.35 | 35.92 | 43.38 | 55.14 |

[Temporal Similarity with Correct Answer]

In order to verify whether the exemplary embodiments of the present disclosure are effective in understanding temporal context, a similarity between a correct answer vector and a global fusion vector corresponding to each time point or time period was calculated.

For example, for a question "which objects were they behind before standing up but after lying on a bed?", the correct answer vector showed the highest similarity to a global fusion feature corresponding to a time point corresponding to "just before standing" in the first exemplary embodiment. That is, it may be seen that the first exemplary embodiment may learn the global fusion feature related to the correct answer.

In addition, for a question "While putting on a shoe, which object did the person close?", the correct answer vector showed the highest similarity to a global fusion feature corresponding to a time point when the person interacted with the shoe and closed a laptop in the first exemplary embodiment. That is, it may be seen that the first exemplary embodiment may learn the global fusion feature related to the correct answer.

In addition, for a question "Was the person tidying up the object they were behind first before or after tidying something on the thing they stood on?", the correct answer vector showed the highest similarity to a global fusion feature corresponding to a time point when the person changes an action between a time point corresponding to "tidying the floor" and a time point corresponding to "tidying the object they were behind" in the first exemplary embodiment. That is, it may be seen that the first exemplary embodiment may learn the global fusion feature related to the correct answer.

So far, while the exemplary embodiments of the present disclosure have been shown and described above, those skilled in the art will be able to appreciate that various changes may be made in the forms and details without departing from the spirit and scope of the present exemplary embodiments as defined by the appended claims and their equivalents.

What is claimed is:

1. An electronic device for multimodal temporal-axis fusion artificial intelligence models, the electronic device comprising:
    a storage unit; and
    a processor,
    wherein the processor obtains a plurality of first visual features respectively corresponding to a plurality of different time points or time periods from a video, obtains a plurality of text features respectively corresponding to the plurality of time points or time periods from text, obtains a plurality of first local fusion features, respectively corresponding to the plurality of time points or time periods, from the plurality of first visual features and the plurality of text features by fusing the first visual features and the text features, which correspond to a same time point or time period, and obtains at least one global fusion feature from the plurality of first local fusion features, and
    in order to obtain the plurality of text features, the processor obtains a plurality of first intermediate text features from the text, obtains a plurality of second intermediate text features respectively corresponding to the plurality of time points or time periods from the plurality of first intermediate text features by using a plurality of mapping layers respectively corresponding to the plurality of time points or time periods, and obtains the plurality of text features from the plurality of second intermediate text features by changing dimensions of the second intermediate text features.

2. The electronic device of claim 1, wherein the number of the plurality of first intermediate text features is different from the number of the plurality of second intermediate text features.

3. The electronic device of claim 1, wherein a dimension of each of the plurality of text features is a same as a dimension of each of the plurality of first visual features.

4. The electronic device of claim 1, wherein, in order to obtain the plurality of first local fusion features, the processor obtains the first local fusion features from the first visual features and the text features by using convolution.

5. The electronic device of claim 1, wherein, in order to obtain the plurality of first local fusion features, the processor obtains a plurality of first intermediate local fusion features from the first visual features and the text features, obtains a plurality of second intermediate local fusion features from the first intermediate local fusion features by using convolution, and obtains the first local fusion features from the first visual features and the second intermediate local fusion features.

6. The electronic device of claim 1, wherein, in order to obtain the plurality of first visual features, the processor obtains a plurality of object features from the video, obtains a plurality of object graphs from the plurality of object features, and obtains the plurality of first visual features from the plurality of object graphs.

7. The electronic device of claim 1, wherein the processor obtains a plurality of second visual features respectively corresponding to the plurality of time points or time periods from the video, obtains a plurality of second local fusion features, respectively corresponding to the plurality of time points or time periods, from the plurality of second visual features and the plurality of text features by fusing the second visual features and the text features, which correspond to the same time point or time period, obtains a plurality of third local fusion features respectively corresponding to the plurality of time points or time periods from the plurality of first local fusion features and the plurality of second local fusion features, and obtains the at least one global fusion feature from the plurality of third local fusion features.

8. The electronic device of claim 1, wherein, in order to obtain the at least one global fusion feature, the processor obtains the at least one global fusion feature from the plurality of first local fusion features by using self-attention.

9. The electronic device of claim 1, wherein the text comprises a question, and
    the processor obtains an answer to the question by using the at least one global fusion feature.

10. The electronic device of claim 9, wherein the at least one global fusion feature comprises a plurality of global fusion features, and
    in order to obtain the answer to the question, the processor obtains an aggregated vector from the plurality of global fusion features, obtains a plurality of option features respectively from a plurality of options, and obtains the answer to the question from the aggregated vector and each option feature.

11. The electronic device of claim 1, wherein the processor classifies, searches, predicts, or generates the video by using the at least one global fusion feature.

12. An operation method of an electronic device for multimodal temporal-axis fusion artificial intelligence models, the operation method comprising:
    obtaining a plurality of first visual features respectively corresponding to a plurality of different time points or time periods from a video;
    obtaining a plurality of text features respectively corresponding to the plurality of time points or time periods from text;
    obtaining a plurality of first local fusion features, respectively corresponding to the plurality of time points or time periods, from the plurality of first visual features and the plurality of text features by fusing the first visual features and the text features, which correspond to a same time point or time period; and
    obtaining at least one global fusion feature from the plurality of first local fusion features, and wherein the obtaining of the plurality of text features comprises:
obtaining a plurality of first intermediate text features from the text;
obtaining a plurality of second intermediate text features respectively corresponding to the plurality of time points or time periods from the plurality of first intermediate text features by using a plurality of mapping layers respectively corresponding to the plurality of time points or time periods; and
obtaining the plurality of text features from the plurality of second intermediate text features by changing dimensions of the second intermediate text features.

13. The operation method of claim 12, wherein the number of the plurality of first intermediate text features is different from the number of the plurality of second intermediate text features.

14. The operation method of claim 12, wherein a dimension of each of the plurality of text features is a same as a dimension of each of the plurality of first visual features.

15. The operation method of claim 12, wherein the obtaining of the plurality of first local fusion features comprises:
obtaining the first local fusion features from the first visual features and the text features by using convolution.

16. The operation method of claim 12, wherein the obtaining of the plurality of first local fusion features comprises:
obtaining a plurality of first intermediate local fusion features from the first visual features and the text features;
obtaining a plurality of second intermediate local fusion features from the first intermediate local fusion features by using convolution; and
obtaining the first local fusion features from the first visual features and the second intermediate local fusion features.

17. The operation method of claim 12, wherein the obtaining of the plurality of first visual features comprises:
obtaining a plurality of object features from the video;
obtaining a plurality of object graphs from the plurality of object features; and
obtaining the plurality of first visual features from the plurality of object graphs.

18. The operation method of claim 12, further comprising:
obtaining a plurality of second visual features respectively corresponding to the plurality of time points or time periods from the video;
obtaining a plurality of second local fusion features, respectively corresponding to the plurality of time points or time periods, from the plurality of second visual features and the plurality of text features by fusing the second visual features and the text features, which correspond to the same time point or time period; and
obtaining a plurality of third local fusion features respectively corresponding to the plurality of time points or time periods from the plurality of first local fusion features and the plurality of second local fusion features,
wherein the obtaining of the at least one global fusion feature comprises:
obtaining the at least one global fusion feature from the plurality of third local fusion features.

19. The operation method of claim 12, wherein the obtaining of the at least one global fusion feature comprises:
obtaining the at least one global fusion feature from the plurality of first local fusion features by using self-attention.

20. The operation method of claim 12, further comprising:
obtaining an answer to a question by using the at least one global fusion feature,
wherein the text comprises the question.

21. The operation method of claim 20, wherein the at least one global fusion feature comprises a plurality of global fusion features, and
the obtaining of the answer to the question comprises:
obtaining an aggregated vector from the plurality of global fusion features;
obtaining a plurality of option features respectively from a plurality of options; and
obtaining the answer to the question from the aggregated vector and each option feature.

22. The operation method of claim 12, further comprising:
classifying, searching, predicting, or generating the video by using the at least one global fusion feature.

* * * * *

UNITED STATES PATENT AND TRADEMARK OFFICE
CERTIFICATE OF CORRECTION

| | |
|---|---|
| PATENT NO. | : 12,299,967 B2 |
| APPLICATION NO. | : 18/809395 |
| DATED | : May 13, 2025 |
| INVENTOR(S) | : Dong Chan Park et al. |

Page 1 of 1

It is certified that error appears in the above-identified patent and that said Letters Patent is hereby corrected as shown below:

On the Title Page

In item (30) Foreign Application Priority Data:
Insert the following:
--Sep. 4, 2023 (KR) ………………….. 10-2023-0116664--

Signed and Sealed this
Twenty-ninth Day of July, 2025

Coke Morgan Stewart
*Acting Director of the United States Patent and Trademark Office*